(12) United States Patent
Shan et al.

(10) Patent No.: US 9,565,650 B2
(45) Date of Patent: Feb. 7, 2017

(54) COMMUNICATION EVENT NOTIFICATION METHOD, APPARATUS, AND SYSTEM

(71) Applicant: Huawei Technologies Co., Ltd., Shenzhen (CN)

(72) Inventors: Zhenwei Shan, Shenzhen (CN); Yu Zhu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/901,978

(22) PCT Filed: Jun. 10, 2014

(86) PCT No.: PCT/CN2014/079627
§ 371 (c)(1),
(2) Date: Dec. 29, 2015

(87) PCT Pub. No.: WO2016/000099
PCT Pub. Date: Jan. 7, 2016

(65) Prior Publication Data
US 2016/0227511 A1 Aug. 4, 2016

(51) Int. Cl.
*H04B 1/38* (2015.01)
*H04B 7/26* (2006.01)
*H04W 40/12* (2009.01)
*H04W 68/00* (2009.01)
*H04W 88/04* (2009.01)
(Continued)

(52) U.S. Cl.
CPC .......... *H04W 68/005* (2013.01); *H04B 1/385* (2013.01); *H04B 7/26* (2013.01); *H04M 3/02* (2013.01); *H04W 4/005* (2013.01); *H04W 4/008* (2013.01); *H04W 8/005* (2013.01); *H04W 40/12* (2013.01); *H04W 88/04* (2013.01); *H04W 4/02* (2013.01); *H04W 84/20* (2013.01)

(58) Field of Classification Search
CPC .... H04W 40/12; H04W 68/00; H04W 68/005; H04W 88/04; H04B 1/38; H04B 1/385; H04B 7/26
USPC ........................................................ 455/567
See application file for complete search history.

(56) References Cited

U.S. PATENT DOCUMENTS

2006/0126582 A1   6/2006  Saifullah et al.
2006/0255963 A1  11/2006  Thompson et al.
(Continued)

FOREIGN PATENT DOCUMENTS

CN       1722642 A       1/2006
CN     201278554 Y       7/2009
(Continued)

*Primary Examiner* — Blane Jackson
(74) *Attorney, Agent, or Firm* — Slater Matsil, LLP

(57) ABSTRACT

A communication event notification method, an apparatus, and system, which relate to the communications field and can flexibly present notification information according to a preset condition. The method includes learning, by a central device, of a communication event; determining, by the central device, an identifier of at least one bridge device according to parameter information of a candidate bridge device, where parameter information of the at least one bridge device meets a preset condition; and sending, by the central device according to the identifier of the at least one bridge device, notification information corresponding to the communication event to the at least one bridge device.

15 Claims, 10 Drawing Sheets

(51) Int. Cl.
*H04W 4/00*     (2009.01)
*H04W 8/00*     (2009.01)
*H04B 1/3827*   (2015.01)
*H04M 3/02*     (2006.01)
*H04W 4/02*     (2009.01)
*H04W 84/20*    (2009.01)

(56) References Cited

U.S. PATENT DOCUMENTS

| | | | |
|---|---|---|---|
| 2007/0060054 A1* | 3/2007 | Romesburg | H04M 1/6041 455/41.2 |
| 2013/0046871 A1 | 2/2013 | Vik et al. | |
| 2013/0136089 A1* | 5/2013 | Gillett | H04W 72/048 370/329 |
| 2013/0316744 A1* | 11/2013 | Newham | H04M 19/04 455/458 |
| 2013/0324167 A1* | 12/2013 | Bevil | H04M 1/725 455/458 |
| 2015/0207916 A1* | 7/2015 | Xue | H04W 4/12 455/412.2 |

FOREIGN PATENT DOCUMENTS

| | | |
|---|---|---|
| CN | 102684775 A | 9/2012 |
| CN | 103051972 A | 4/2013 |
| CN | 103596060 A | 2/2014 |
| CN | 103647858 A | 3/2014 |
| CN | 103823653 A | 5/2014 |
| WO | 2014075715 A1 | 5/2014 |

* cited by examiner

A wearable device sends a first wireless broadcast signal to multiple candidate bridge devices, so that after acquiring multiple pieces of reference information separately according to the first wireless broadcast signal, the multiple candidate bridge devices send the multiple pieces of reference information to a central device; the central device determines multiple pieces of parameter information according to the multiple pieces of reference information, determines, from the multiple candidate bridge devices, an identifier of at least one bridge device of which parameter information meets a preset condition, and sends, according to the identifier of the at least one bridge device, notification information corresponding to a communication event to the at least one bridge device; and the at least one bridge device presents the notification information, where the notification information is information acquired according to the communication event after the communication event is learned, and the central device is corresponding to the wearable device ⟵ S301

FIG. 3

COMMUNICATION EVENT NOTIFICATION METHOD, APPARATUS, AND SYSTEM

This application is a National Stage of International Application No. PCT/CN2014/079627, filed on Jun. 10, 2014, which is hereby incorporated by reference in its entirety.

TECHNICAL FIELD

The present invention relates to the communications field, and in particular, to a communication event notification method, an apparatus, and a system.

BACKGROUND

The development of communications technologies has made mobile phone communication an indispensable part of people's routine life, for instance, all information exchanges between one user and another can be implemented by means of mobile phone communication. Generally, in some indoor environments, because of being away from a mobile phone, or other like cases, a user often misses a communication event such as a call or a short message. Consequently, the user cannot exchange information with another user.

In the prior art, when a user's mobile phone receives a communication event, a function of notifying the user may be generally implemented by using two methods. In one aspect, a smart television may be used to notify the user of a communication event received by the user's mobile phone. Optionally, a connection between the smart television and the mobile phone may be implemented by using a wireless communications technology. When receiving a communication event, the mobile phone may send the communication event to the smart television by using the wireless communications technology, so that the smart television can present the communication event to the user to notify the user of the communication event received by the user's mobile phone. In the other aspect, a wearable device may be used to notify the user of a communication event received by the user's mobile phone. Optionally, a connection between the wearable device and the mobile phone may be implemented by using a Bluetooth technology. When receiving a communication event, the mobile phone may send the communication event to the wearable device by using the Bluetooth technology, so that the wearable device can present the communication event to the user to notify the user of the communication event received by the user's mobile phone.

However, in one aspect, if the smart television is used to notify the user of the communication event received by the user's mobile phone, due to a limitation of a position where the smart television is placed, the user cannot see a notification of the communication event when the user is not near the smart television; therefore, a function of notifying the user by the smart television is subject to a geographical restriction. In the other aspect, if the wearable device is used to notify the user of the communication event received by the user's mobile phone, due to a limited effective distance of the used Bluetooth technology, the user cannot receive the notification of the communication event when a distance between the user and the mobile phone is greater than an effective distance of Bluetooth transmission; therefore, a function of notifying the user by the wearable device is subject to a distance restriction.

SUMMARY

Embodiments of the present invention provide a communication event notification method, an apparatus, and a system, which can flexibly present notification information according to a preset condition.

To achieve the foregoing objective, the following technical solutions are used in the embodiments of the present invention:

According to a first aspect, an embodiment of the present invention provides a communication event notification method, including:

learning, by a central device, of a communication event;
determining, by the central device, an identifier of at least one bridge device according to parameter information of a candidate bridge device, where parameter information of the at least one bridge device meets a preset condition, and the parameter information of the candidate bridge device includes at least one of the following:

an actual distance between the candidate bridge device and a wearable device;
a converted distance between the candidate bridge device and the wearable device; and
transmission signal strength between the candidate bridge device and the wearable device, and position information of the candidate bridge device and position information of the wearable device; and
sending, by the central device according to the identifier of the at least one bridge device, notification information corresponding to the communication event to the at least one bridge device, so that the at least one bridge device presents the notification information.

In a first possible implementation manner of the first aspect, the parameter information is at least one of: the actual distance and the converted distance, and the preset condition includes a first preset condition, where the first preset condition is that the distance is shortest or the distance is less than a first preset threshold; or the parameter information is the transmission signal strength, and the preset condition includes a second preset condition, where the second preset condition is that the signal strength is strongest or the signal strength is greater than a second preset threshold; or the parameter information is the position information of the candidate bridge device and the position information of the wearable device, and the preset condition includes a third preset condition, where the third preset condition is that a preset geographical scope is met.

With reference to the first aspect or the first possible implementation manner of the first aspect, in a second possible implementation manner, the actual distance is determined, by the central device after acquiring the position information of the candidate bridge device and the position information of the wearable device that are reported by the candidate bridge device, according to the position information of the candidate bridge device and the position information of the wearable device;

the transmission signal strength is determined by the central device after acquiring information reported by the candidate bridge device; and the converted distance is obtained by the central device through calculation according to the transmission signal strength.

With reference to the first possible implementation manner of the first aspect, in a third possible implementation manner, the parameter information further includes a presenting capability, and the preset condition further includes a fourth preset condition, where the fourth preset condition is that an image is presented, or an image and a sound are presented, and that parameter information of the at least one bridge device meets a preset condition includes that:

the actual distance meets the first preset condition, and the presenting capability meets the fourth preset condition; or the converted distance meets the first preset condition, and the presenting capability meets the fourth preset condition; or the transmission signal strength meets the second preset condition, and the presenting capability meets the fourth preset condition; or the position information of the candidate bridge device and the position information of the wearable device meet the third preset condition, and the presenting capability meets the fourth preset condition; or the actual distance meets the first preset condition, the transmission signal strength meets the second preset condition, and the presenting capability meets the fourth preset condition; or the converted distance meets the first preset condition, the transmission signal strength meets the second preset condition, and the presenting capability meets the fourth preset condition; or the actual distance meets the first preset condition, the position information of the candidate bridge device and the position information of the wearable device meet the third preset condition, and the presenting capability meets the fourth preset condition; or the converted distance meets the first preset condition, the position information of the candidate bridge device and the position information of the wearable device meet the third preset condition, and the presenting capability meets the fourth preset condition.

With reference to the first aspect or any possible implementation manner of the first possible implementation manner to the third possible implementation manner of the first aspect, in a fourth possible implementation manner, before the determining, by the central device, an identifier of at least one bridge device, the method further includes:

sending, by the central device, a request message separately to the candidate bridge device, where the request message is used to request the candidate bridge device to separately provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: the actual distance between the candidate bridge device and the wearable device, and the position information of the candidate bridge device and the position information of the wearable device; or the information reporting service is the transmission signal strength reporting service, and the parameter information includes at least one of: the converted distance between the candidate bridge device and the wearable device, and the transmission signal strength between the candidate bridge device and the wearable device; or the information reporting service is the position information reporting service and the transmission signal strength reporting service, and the parameter information includes: the actual distance between the candidate bridge device and the wearable device, the position information of the candidate bridge device and the position information of the wearable device, and at least one of: the converted distance between the candidate bridge device and the wearable device, and the transmission signal strength between the candidate bridge device and the wearable device.

With reference to the first aspect or any possible implementation manner of the first possible implementation manner to the fourth possible implementation manner of the first aspect, in a fifth possible implementation manner, the central device is the user equipment, the candidate bridge device, or the wearable device.

According to a second aspect, an embodiment of the present invention provides a communication event notification method, including:

receiving, by a bridge device, a transmission signal sent by a wearable device;

determining, by the bridge device, reference information of the bridge device according to the transmission signal, where the reference information of the bridge device includes: position information of the bridge device and position information of the wearable device; or includes transmission signal strength of the transmission signal; or includes position information of the bridge device, position information of the wearable device, and transmission signal strength; and reporting, by the bridge device, the reference information to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition.

In a first possible implementation manner of the second aspect, after the reporting, by the bridge device, the reference information to the central device corresponding to the wearable device, the method further includes:

receiving, by the bridge device, the notification information sent by the central device; and presenting, by the bridge device, the notification information according to a presenting capability of the bridge device.

With reference to the second aspect or the first possible implementation manner of the second aspect, in a second possible implementation manner, the reference information of the bridge device includes: the position information of the bridge device, the position information of the wearable device, and the presenting capability of the bridge device; or includes the transmission signal strength of the transmission signal and the presenting capability of the bridge device; or includes the position information of the bridge device, the position information of the wearable device, the transmission signal strength, and the presenting capability of the bridge device.

With reference to the second aspect or any possible implementation manner of the first possible implementation manner to the second possible implementation manner of the second aspect, in a third possible implementation manner, before the receiving, by a bridge device, a transmission signal sent by a wearable device, the method further includes:

receiving, by the bridge device, a request message sent by the central device, where the request message is used to request the bridge device to provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: an actual distance between the candidate bridge device and the wearable device, and the position information of the candidate bridge device and the position information of the wearable device; or the information reporting service is the transmission signal strength reporting service, and the parameter information includes at least one of: a converted distance between the candidate bridge device and the wearable device, and transmission signal strength between the candidate bridge device and the wearable device; or the information reporting service is the position information reporting service and the transmission signal strength reporting service, and the parameter information includes: an actual distance between the candidate bridge device and the wearable device, the position information of the candidate bridge device and the position information of the wearable device, and at least one of: a converted distance between the candidate bridge device and the wearable device, and transmission signal strength between the candidate bridge device and the wearable device.

According to a third aspect, an embodiment of the present invention provides a central device, including:

a learning unit, configured to learn of a communication event;

a determining unit, configured to determine an identifier of at least one bridge device according to parameter information of a candidate bridge device, where parameter information of the at least one bridge device meets a preset condition, and the parameter information of the candidate bridge device includes at least one of the following:

an actual distance between the candidate bridge device and a wearable device;

a converted distance between the candidate bridge device and the wearable device; and transmission signal strength between the candidate bridge device and the wearable device, and position information of the candidate bridge device and position information of the wearable device; and a sending unit, configured to send, according to the identifier of the at least one bridge device, notification information corresponding to the communication event learned of by the learning unit to the at least one bridge device, so that the at least one bridge device presents the notification information.

In a first possible implementation manner of the third aspect, the parameter information is at least one of: the actual distance and the converted distance, and the preset condition includes a first preset condition, where the first preset condition is that the distance is shortest or the distance is less than a first preset threshold; or the parameter information is the transmission signal strength, and the preset condition includes a second preset condition, where the second preset condition is that the signal strength is strongest or the signal strength is greater than a second preset threshold; or the parameter information is the position information of the candidate bridge device and the position information of the wearable device, and the preset condition includes a third preset condition, where the third preset condition is that a preset geographical scope is met.

With reference to the third aspect or the first possible implementation manner of the third aspect, in a second possible implementation manner, the central device further includes an acquiring unit and a calculating unit, where:

the actual distance is determined, after the acquiring unit acquires the position information of the candidate bridge device and the position information of the wearable device that are reported by the candidate bridge device, by the determining unit according to the position information of the candidate bridge device and the position information of the wearable device that are acquired by the acquiring unit;

the transmission signal strength is determined by the determining unit according to information that is reported by the candidate bridge device and acquired by the acquiring unit; and the converted distance is obtained by the calculating unit through calculation according to the transmission signal strength determined by the determining unit.

With reference to the first possible implementation manner of the third aspect, in a third possible implementation manner, the parameter information further includes a presenting capability, and the preset condition further includes a fourth preset condition, where the fourth preset condition is that an image is presented, or an image and a sound are presented, and the actual distance determined by the determining unit meets the first preset condition, and the presenting capability meets the fourth preset condition; or the converted distance calculated by the calculating unit meets the first preset condition, and the presenting capability meets the fourth preset condition; or the transmission signal strength determined by the determining unit meets the second preset condition, and the presenting capability meets the fourth preset condition; or the position information of the candidate bridge device and the position information of the wearable device that are acquired by the acquiring unit meet the third preset condition, and the presenting capability meets the fourth preset condition; or the actual distance meets the first preset condition, the transmission signal strength meets the second preset condition, and the presenting capability meets the fourth preset condition; or the converted distance meets the first preset condition, the transmission signal strength meets the second preset condition, and the presenting capability meets the fourth preset condition; or the actual distance meets the first preset condition, the position information of the candidate bridge device and the position information of the wearable device meet the third preset condition, and the presenting capability meets the fourth preset condition; or the converted distance meets the first preset condition, the position information of the candidate bridge device and the position information of the wearable device meet the third preset condition, and the presenting capability meets the fourth preset condition.

With reference to the third aspect or any possible implementation manner of the first possible implementation manner to the third possible implementation manner of the third aspect, in a fourth possible implementation manner, the sending unit is further configured to, before the determining unit determines the identifier of the at least one bridge device, send a request message separately to the candidate bridge device, where the request message is used to request the candidate bridge device to separately provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: the actual distance between the candidate bridge device and the wearable device, and the position information of the candidate bridge device and the position information of the wearable device; or the information reporting service is the transmission signal strength reporting service, and the parameter information includes at least one of: the converted distance between the candidate bridge device and the wearable device, and the transmission signal strength between the candidate bridge device and the wearable device; or the information reporting service is the position information reporting service and the transmission signal strength reporting service, and the parameter information includes: the actual distance between the candidate bridge device and the wearable device, the position information of the candidate bridge device and the position information of the wearable device, and at least one of: the converted distance between the candidate bridge device and the wearable device, and the transmission signal strength between the candidate bridge device and the wearable device.

With reference to the third aspect or any possible implementation manner of the first possible implementation manner to the fourth possible implementation manner of the third aspect, in a fifth possible implementation manner, the central device is the user equipment, the candidate bridge device, or the wearable device.

According to a fourth aspect, an embodiment of the present invention provides a bridge device, including:

a receiving unit, configured to receive a transmission signal sent by a wearable device;

a determining unit, configured to determine reference information of the bridge device according to the transmission signal received by the receiving unit, where the reference information of the bridge device includes: position information of the bridge device and position information of the wearable device; or includes transmission signal strength of the transmission signal; or includes position information of the bridge device, position information of the wearable device, and transmission signal strength; and a sending unit, configured to report the reference information determined by the determining unit to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition.

In a first possible implementation manner of the fourth aspect, the bridge device further includes a presenting unit, where:

the receiving unit is further configured to, after the sending unit reports the reference information to the central device corresponding to the wearable device, receive the notification information sent by the central device; and the presenting unit is configured to present, according to a presenting capability of the bridge device, the notification information received by the receiving unit.

With reference to the fourth aspect or the first possible implementation manner of the fourth aspect, in a second possible implementation manner, the reference information of the bridge device includes: the position information of the bridge device, the position information of the wearable device, and the presenting capability of the bridge device; or includes the transmission signal strength of the transmission signal and the presenting capability of the bridge device; or includes the position information of the bridge device, the position information of the wearable device, the transmission signal strength, and the presenting capability of the bridge device.

With reference to the fourth aspect or any possible implementation manner of the first possible implementation manner to the second possible implementation manner of the fourth aspect, in a third possible implementation manner, the receiving unit is further configured to, before receiving the transmission signal sent by the wearable device, receive a request message sent by the central device, where the request message is used to request the bridge device to provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: an actual distance between the candidate bridge device and the wearable device, and the position information of the candidate bridge device and the position information of the wearable device; or the information reporting service is the transmission signal strength reporting service, and the parameter information includes at least one of: a converted distance between the candidate bridge device and the wearable device, and transmission signal strength between the candidate bridge device and the wearable device; or the information reporting service is the position information reporting service and the transmission signal strength reporting service, and the parameter information includes: an actual distance between the candidate bridge device and the wearable device, the position information of the candidate bridge device and the position information of the wearable device, and at least one of: a converted distance between the candidate bridge device and the wearable device, and transmission signal strength between the candidate bridge device and the wearable device.

According to a fifth aspect, an embodiment of the present invention provides a central device, including:

a processor, configured to learn of a communication event, and determine an identifier of at least one bridge device according to parameter information of a candidate bridge device, where parameter information of the at least one bridge device meets a preset condition, and the parameter information of the candidate bridge device includes at least one of the following:

an actual distance between the candidate bridge device and a wearable device;

a converted distance between the candidate bridge device and the wearable device; and transmission signal strength between the candidate bridge device and the wearable device, and position information of the candidate bridge device and position information of the wearable device; and a sender, configured to send, according to the identifier of the at least one bridge device, notification information corresponding to the communication event learned of by the processor to the at least one bridge device, so that the at least one bridge device presents the notification information.

In a first possible implementation manner of the fifth aspect, the parameter information is at least one of: the actual distance and the converted distance, and the preset condition includes a first preset condition, where the first preset condition is that the distance is shortest or the distance is less than a first preset threshold; or the parameter information is the transmission signal strength, and the preset condition includes a second preset condition, where the second preset condition is that the signal strength is strongest or the signal strength is greater than a second preset threshold; or the parameter information is the position information of the candidate bridge device and the position information of the wearable device, and the preset condition includes a third preset condition, where the third preset condition is that a preset geographical scope is met.

With reference to the fifth aspect or the first possible implementation manner of the fifth aspect, in a second possible implementation manner, the central device further includes a receiver, where:

the actual distance is determined, after the receiver acquires the position information of the candidate bridge device and the position information of the wearable device that are reported by the candidate bridge device, by the processor according to the position information of the candidate bridge device and the position information of the wearable device that are acquired by the receiver;

the transmission signal strength is determined by the processor according to information that is reported by the candidate bridge device and acquired by the receiver; and the converted distance is obtained by the processor through calculation according to the transmission signal strength.

With reference to the first possible implementation manner of the fifth aspect, in a third possible implementation manner, the parameter information further includes a presenting capability, and the preset condition further includes a fourth preset condition, where the fourth preset condition is that an image is presented, or an image and a sound are presented; and the actual distance determined by the processor meets the first preset condition, and the presenting capability meets the fourth preset condition; or the converted distance calculated by the processor meets the first preset condition, and the presenting capability meets the fourth preset condition; or the transmission signal strength determined by the processor meets the second preset condition, and the presenting capability meets the fourth preset condition; or the position information of the candidate bridge device and the position information of the wearable device that are acquired by the processor meet the third preset condition, and the presenting capability meets the fourth preset condition; or the actual distance meets the first preset condition, the transmission signal strength meets the second preset condition, and the presenting capability meets the fourth preset condition; or the converted distance meets the first preset condition, the transmission signal strength meets the second preset condition, and the presenting capability meets the fourth preset condition; or the actual distance meets the first preset condition, the position information of the candidate bridge device and the position information of the wearable device meet the third preset condition, and the presenting capability meets the fourth preset condition; or the converted distance meets the first preset condition, the position information of the candidate bridge device and the position information of the wearable device meet the third preset condition, and the presenting capability meets the fourth preset condition.

With reference to the fifth aspect or any possible implementation manner of the first possible implementation manner to the third possible implementation manner of the fifth aspect, in a fourth possible implementation manner, the sender is further configured to, before the processor determines the identifier of the at least one bridge device, send a request message separately to the candidate bridge device, where the request message is used to request the candidate bridge device to separately provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: the actual distance between the candidate bridge device and the wearable device, and the position information of the candidate bridge device and the position information of the wearable device; or the information reporting service is the transmission signal strength reporting service, and the parameter information includes at least one of: the converted distance between the candidate bridge device and the wearable device, and the transmission signal strength between the candidate bridge device and the wearable device; or the information reporting service is the position information reporting service and the transmission signal strength reporting service, and the parameter information includes: the actual distance between the candidate bridge device and the wearable device, the position information of the candidate bridge device and the position information of the wearable device, and at least one of: the converted distance between the candidate bridge device and the wearable device, and the transmission signal strength between the candidate bridge device and the wearable device.

With reference to the fifth aspect or any possible implementation manner of the first possible implementation manner to the fourth possible implementation manner of the fifth aspect, in a fifth possible implementation manner, the central device is the user equipment, the candidate bridge device, or the wearable device.

According to a sixth aspect, an embodiment of the present invention provides a bridge device, including:

a receiver, configured to receive a transmission signal sent by a wearable device;

a processor, configured to determine reference information of the bridge device according to the transmission signal received by the receiver, where the reference information of the bridge device includes: position information of the bridge device and position information of the wearable device; or includes transmission signal strength of the transmission signal; or includes position information of the bridge device, position information of the wearable device, and transmission signal strength; and a sender, configured to report the reference information determined by the processor to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition.

In a first possible implementation manner of the sixth aspect, the bridge device further includes a display, where:

the receiver is further configured to, after the sender reports the reference information to the central device corresponding to the wearable device, receive the notification information sent by the central device; and the display is configured to present, according to a presenting capability of the bridge device, the notification information received by the receiver.

With reference to the sixth aspect or the first possible implementation manner of the sixth aspect, in a second possible implementation manner, the reference information of the bridge device includes: the position information of the bridge device, the position information of the wearable device, and the presenting capability of the bridge device; or includes the transmission signal strength of the transmission signal and the presenting capability of the bridge device; or includes the position information of the bridge device, the position information of the wearable device, the transmission signal strength, and the presenting capability of the bridge device.

With reference to the sixth aspect or any possible implementation manner of the first possible implementation manner to the second possible implementation manner of the sixth aspect, in a third possible implementation manner, the receiver is further configured to, before receiving the transmission signal sent by the wearable device, receive a request message sent by the central device, where the request message is used to request the bridge device to provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: an actual distance between the candidate bridge device and the wearable device, and the position information of the candidate bridge device and the position information of the wearable device; or the information reporting service is the transmission signal strength reporting service, and the parameter information includes at least one of: a converted distance between the candidate bridge device and the wearable device, and transmission signal strength between the candidate bridge device and the wearable device; or the information reporting service is the position information reporting service and the transmission signal strength reporting service, and the parameter information includes: an actual distance between the candidate bridge device and the wearable device, the position information of the candidate bridge device and the position information of the wearable device, and at least one of: a converted distance between the candidate bridge device and the wearable device, and transmission signal strength between the candidate bridge device and the wearable device.

According to the communication event notification method, the apparatus, and the system provided in the embodiments of the present invention, a central device learns of a communication event; the central device determines an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device; and finally, the central device sends, according to the identifier of the at least one bridge device, notification information corresponding to the communication event to the at least one bridge device, so that the at least one bridge device presents the notification information. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

BRIEF DESCRIPTION OF THE DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 3 is flowchart 3 of a communication event notification method according to an embodiment of the present invention;

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Embodiment 1

Figure 1:
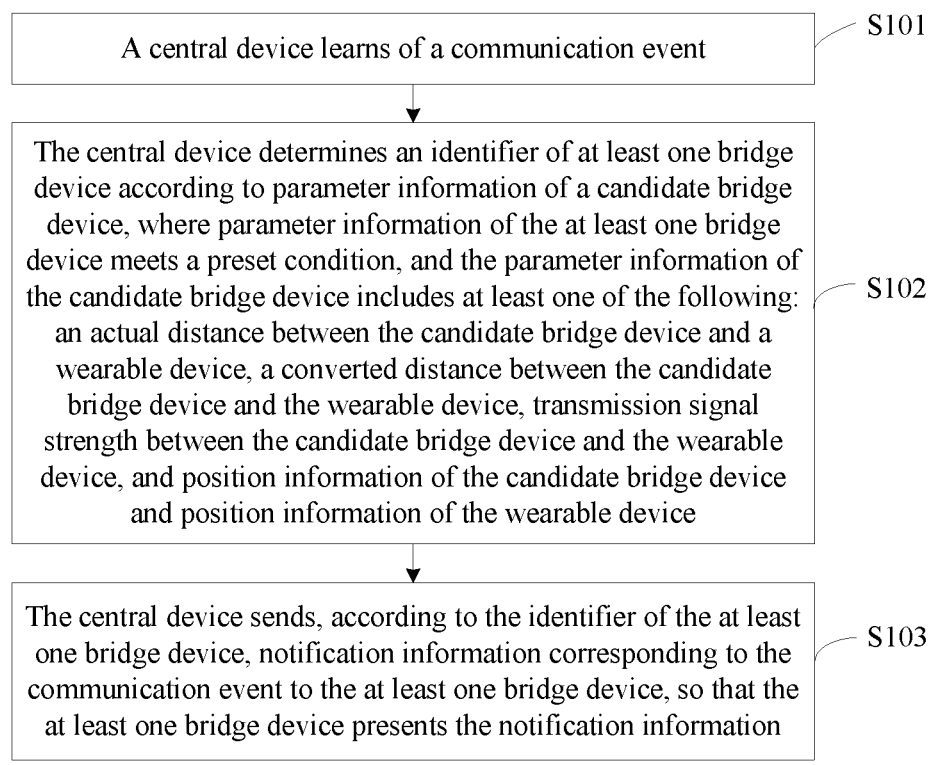
FIG. 1 is flowchart 1 of a communication event notification method according to an embodiment of the present invention.

This embodiment of the present invention provides a communication event notification method. As shown in FIG. 1, the method is a communication event notification method on a central device side, and the method may include the following steps:

S101. A central device learns of a communication event.

It should be noted that the communication event notification method provided in this embodiment of the present invention may be applied to a smart home system. In the smart home system, all smart homes can be interconnected and interworked by using a wired or wireless technology. Common wireless technologies may include: WiFi (Wireless-Fidelity, wireless broadband), Bluetooth (Bluetooth), Zigbee (ZigBee), Z-wave (Z-wave Alliance), and the like.

Optionally, the central device may be a user equipment, a bridge device, or a wearable device.

In this embodiment of the present invention, the central device learns of the communication event; when the central device is a user equipment, the user equipment may receive a communication event sent by another user equipment, where the communication event may be a call, a short message or voice chat information, an instant message, information pushing, or the like; when the central device is a bridge device or a wearable device, the bridge device or the wearable device receives the communication event; alternatively, the bridge device or the wearable device may not receive the communication event directly, but can learn that the communication event is received by the user equipment.

Optionally, the user equipment may be an electronic device such as a smartphone, a computer, or a tablet computer, and the central device may be a device that can learn of a communication event, which is not limited in the present invention.

It should be noted that the wearable device is a smart wearable device such as glasses, gloves, a watch, jewelry, apparel, or shoes. Optionally, current wearable devices include: a smartwatch, a smartband, a head-mounted display, smart shoes, an electronic drum machine T-shirt, and the like. The wearable device in this embodiment of the present invention may be a smart device that can be carried with a user and can send a transmission signal. Bridge devices may include a smart household appliance and an electronic device, for example, a mobile phone, a mobile power supply, a tablet computer, a personal digital assistant, a computer, a media player, a smart television, a sound box, a smart refrigerator, an air conditioner, a water heater, a microwave oven, and a treadmill. The bridge device in this embodiment of the present invention may be a smart device that can send and/or receive a transmission signal.

S102. The central device determines an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device.

In this embodiment of the present invention, after the central device learns of the communication event, the central device may determine the identifier of the at least one bridge device according to the parameter information of the candidate bridge device, where the parameter information of the at least one bridge device meets the preset condition, and the parameter information of the candidate bridge device includes at least one of the following: the actual distance between the candidate bridge device and the wearable device, the converted distance between the candidate bridge device and the wearable device, the transmission signal strength between the candidate bridge device and the wearable device, and the position information of the candidate bridge device and the position information of the wearable device, where the wearable device is corresponding to the central device.

Particularly, in this embodiment of the present invention, the central device determines an identifier of at least one bridge device continuously, where the identifier of the at least one bridge device is an identifier corresponding to at least one bridge device of which parameter information meets the preset condition.

Optionally, after the central device acquires the communication event, the central device may acquire an identifier, determined most recently, of at least one bridge device of which parameter information meets the preset condition, where the identifier, determined by the central device, of the at least one bridge device may be determined at a last time by the central device before the central device acquires the communication event, and is then learned of by the user equipment after receiving the communication event; or may be determined by the central device after the central device learns of the communication event.

Optionally, when the central device can receive the communication event, the central device is corresponding to the wearable device. One central device may be corresponding to multiple wearable devices of a user, that is, the central device is corresponding to the wearable device. In this embodiment of the present invention, that the central device is corresponding to the wearable device may be that the central device is paired with the wearable device, and this embodiment of the present invention constitutes no limitation on a manner of a correspondence between the central device and the wearable device.

It should be noted that a method for determining, by a central device, at least one bridge device of which parameter information meets a preset condition is illustrated in detail in the subsequent embodiments.

It can be understood that there are many methods for determining, by a central device, at least one bridge device of which parameter information meets a preset condition, which is not limited to the method provided in this embodiment of the present invention.

Optionally, the identifier of the at least one bridge device may be a name of the bridge device, an ID (Identity, identity) of the bridge device, an icon or code representing the bridge device, or the like, which is not limited in the present invention.

S103. The central device sends, according to the identifier of the at least one bridge device, notification information corresponding to the communication event to the at least one bridge device, so that the at least one bridge device presents the notification information.

After the central device determines the identifier of the at least one bridge device according to the parameter information of the candidate bridge device, the central device sends, according to the identifier of the at least one bridge device, the notification information corresponding to the communication event separately to each bridge device in the at least one bridge device, so that each bridge device presents the notification information separately, where the at least one bridge device is a bridge device, of which parameter information meets the preset condition, that is determined by the central device.

The candidate bridge device and the central device in the communication event notification method provided in this embodiment of the present invention may belong to a same local network, that is, they are located in a same smart home system, and all smart homes may be interconnected and interworked by using a wired or wireless technology. The candidate bridge device and the central device may also communicate with each other by using an operator network or the Internet.

Optionally, the notification information in this embodiment of the present invention is information acquired according to the communication event.

Illustratively, after a smartphone receives a call 1 from A, the smartphone can learn that an acquired communication event is a call; therefore, according to a type of the acquired communication event, that is, a call, the smartphone can acquire a ringtone of the call 1, an incoming call number, a number of the smartphone, and the like. All of the ringtone of the call 1, the incoming call number, and the number of the smartphone are information related to the call 1 from A, that is, they are notification information corresponding to the call 1.

It should be noted that in this embodiment of the present invention, the central device, the wearable device, and the bridge device are in a switched-on or powered-on state.

Figure 2:
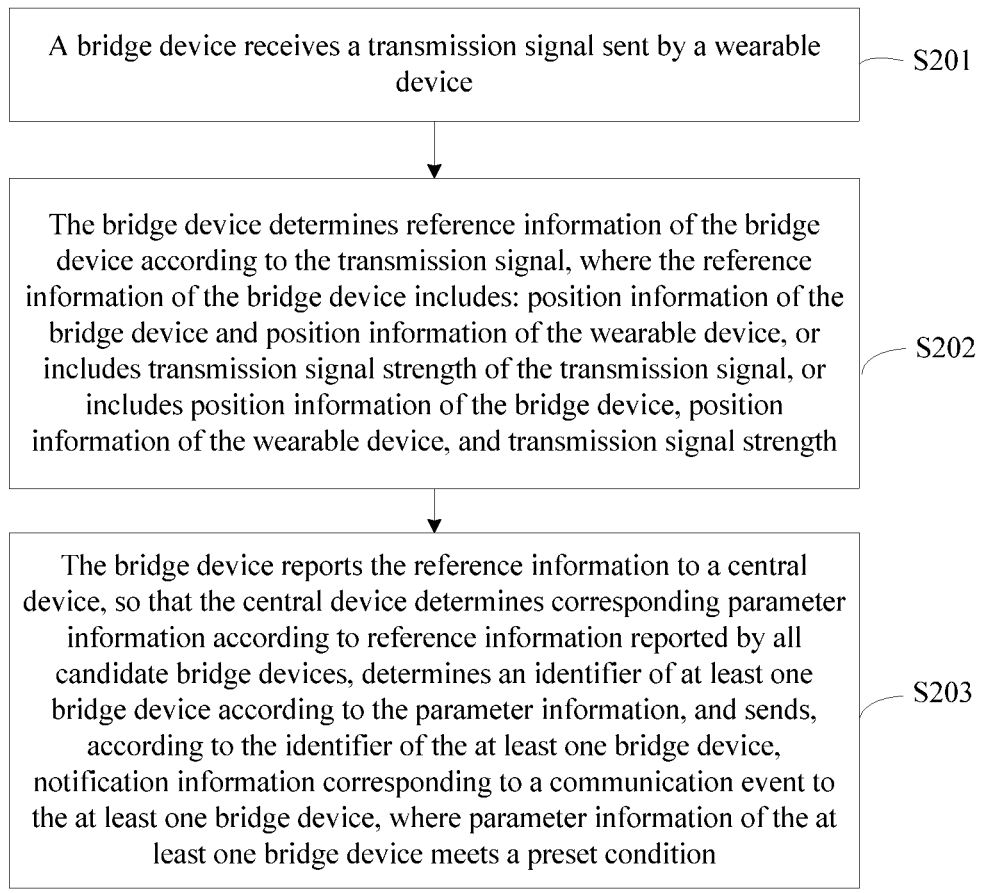
FIG. 2 is flowchart 2 of a communication event notification method according to an embodiment of the present invention.

This embodiment of the present invention further provides a communication event notification method. As shown in FIG. 2, the method is a communication event notification method on a bridge device side, and the method may include the following steps:

S201. A bridge device receives a transmission signal sent by a wearable device.

It should be noted that the bridge device and the wearable device in this embodiment of the present invention are interconnected and interworked by using a wireless technology. One bridge device can perform wireless communication separately with multiple wearable devices.

The bridge device receives the transmission signal, that is, a first wireless broadcast signal, sent by the wearable device, where an identifier of the wearable device is carried in the first wireless broadcast signal.

It should be noted that, because the identifier of the wearable device may be carried in the first wireless broadcast signal, after the bridge device acquires the identifier of the wearable device, the bridge device may acquire an identifier of a central device according to a correspondence between the wearable device and the central device, and may send, according to the identifier of the central device, information corresponding to the central device to the central device, where the central device refers to a device that can receive a communication event.

Optionally, a manner in which a wearable device sends a first wireless broadcast signal may be periodic, or may be aperiodic. An optional sending manner depends on an actual situation, which is not limited in this embodiment of the present invention.

Illustratively, all wearable devices in a smart home system are A, B, C, and D; the bridge device acquires a first wireless broadcast signal sent periodically by the wearable device A, where a period in which the wearable device A sends the first wireless broadcast signal is 10 seconds; alternatively, the bridge device acquires a first wireless broadcast signal sent intermittently by the wearable device A, that is, the wearable device A sends the first wireless broadcast signal at an irregular time interval.

S202. The bridge device determines reference information of the bridge device according to the transmission signal, where the reference information of the bridge device includes: position information of the bridge device and position information of the wearable device, or includes transmission signal strength of the transmission signal, or includes position information of the bridge device, position information of the wearable device, and transmission signal strength.

After the bridge device receives the transmission signal sent by the wearable device, the bridge device determines the reference information of the bridge device according to the transmission signal, where the reference information of the bridge device includes: the position information of the bridge device and the position information of the wearable device, or the transmission signal strength of the transmission signal, or the position information of the bridge device, the position information of the wearable device, and the transmission signal strength.

It should be noted that the position information of the wearable device and the transmission signal strength of the transmission signal that are included in the reference information are determined by the bridge device according to the transmission signal.

S203. The bridge device reports the reference information to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition.

After the bridge device determines the reference information of the bridge device according to the transmission signal, the bridge device reports the reference information to the central device, so that the central device determines the corresponding parameter information according to the reference information reported by all candidate bridge devices, determines the identifier of the at least one bridge device according to the parameter information, and sends, according to the identifier of the at least one bridge device, the notification information corresponding to the communication event to the at least one bridge device, where the parameter information of the at least one bridge device meets the preset condition.

It should be noted that candidate bridge devices in this embodiment of the present invention are multiple candidate bridge devices, which have an information reporting service, in all the bridge devices; the at least one bridge device is a bridge device, of which parameter information meets the preset condition, in the multiple candidate bridge devices; and all bridge devices are all the bridge devices that can be found in a smart home system.

Particularly, in this embodiment of the present invention, a user equipment, the wearable device, and the bridge device are all in a switched-on or powered-on state.

This embodiment of the present invention further provides a communication event notification method. As shown in FIG. 3, the method is a communication event notification method on a wearable device side, and the method may include the following step:

S301. A wearable device sends a first wireless broadcast signal to multiple candidate bridge devices, so that after acquiring multiple pieces of reference information separately according to the first wireless broadcast signal, the multiple the candidate bridge devices send the multiple pieces of reference information to a central device; the central device determines multiple pieces of parameter information according to the multiple pieces of reference information, determines, from the multiple candidate bridge devices, an identifier of at least one bridge device of which parameter information meets a preset condition, and sends, according to the identifier of the at least one bridge device, notification information corresponding to a communication event to the at least one bridge device; and the at least one bridge device presents the notification information, where the notification information is information acquired according to the communication event after the communication event is learned, and the central device is corresponding to the wearable device.

Optionally, a manner in which a wearable device sends the first transmission signal may be periodic, or may be aperiodic. An optional sending manner depends on an actual situation, which is not limited in this embodiment of the present invention.

It should be noted that the wearable device is a smart wearable device such as glasses, gloves, a watch, jewelry, apparel, or shoes. Optionally, wearable devices currently available on the market include: a smartwatch, a smartband, a head-mounted display, smart shoes, an electronic drum machine T-shirt, and the like. The wearable device in this embodiment of the present invention may be a smart device that can be carried with a user and can send a first transmission signal.

According to the communication event notification method provided in this embodiment of the present invention, a central device learns of a communication event; the central device determines an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device; and finally, the central device sends, according to the identifier of the at least one bridge device, notification information corresponding to the communication event to the at least one bridge device, so that the at least one bridge device presents the notification information. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Embodiment 2

Figure 4A:
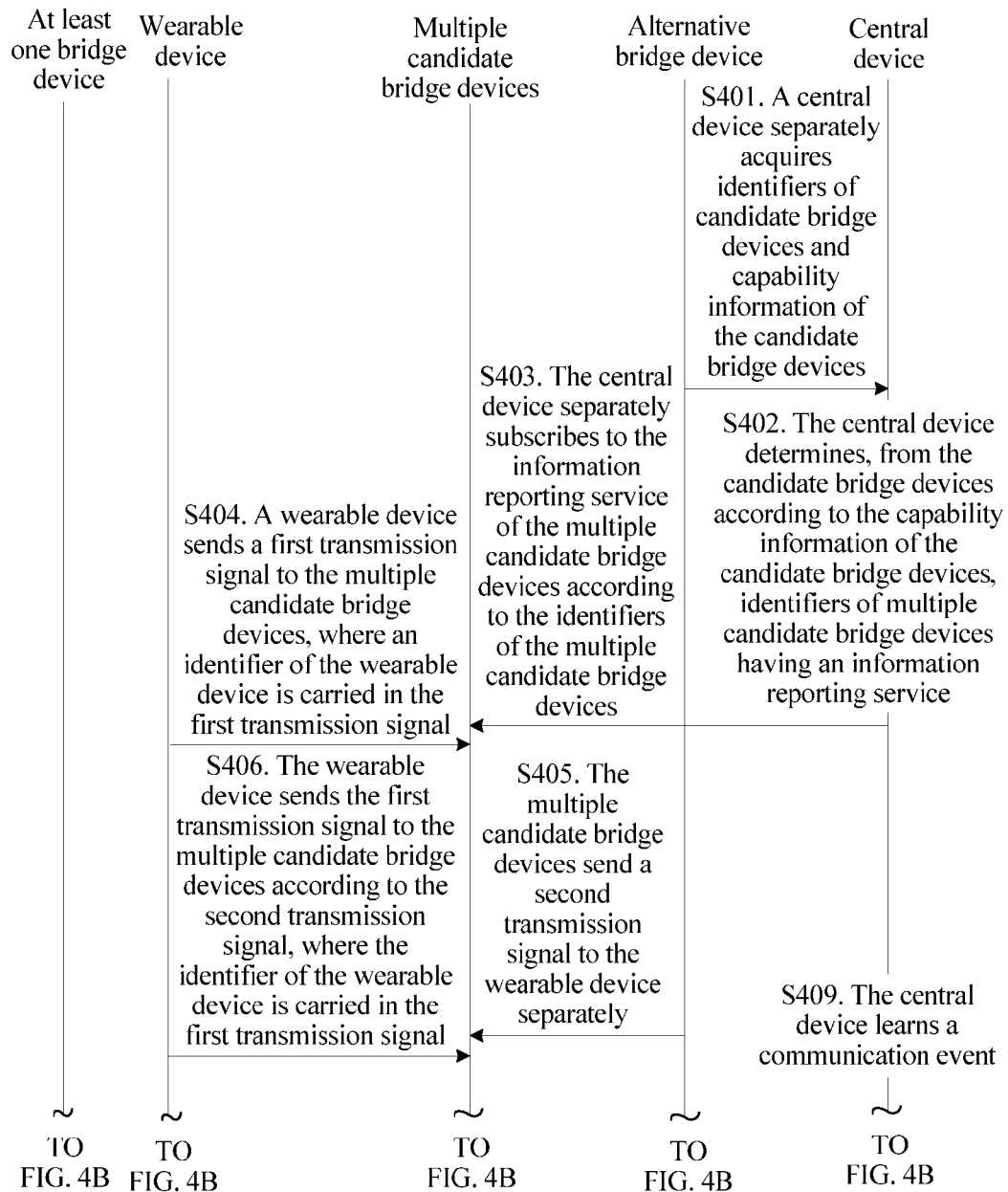
FIG. 4A and FIG. 4B are interaction diagram 1 of a communication event notification method according to an embodiment of the present invention.
Figure 4B:
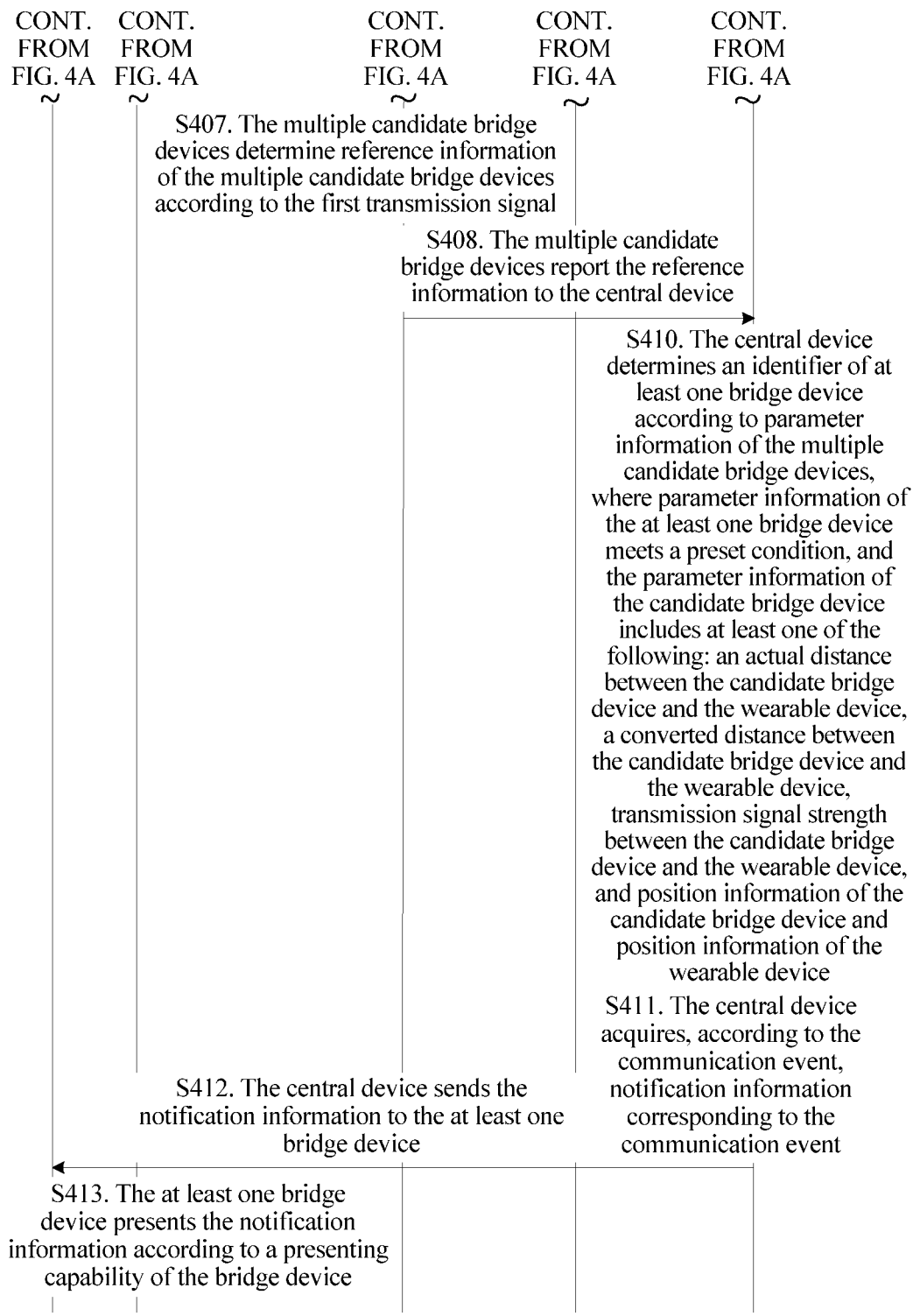

This embodiment of the present invention provides a communication event notification method. As shown in FIG. 4A and FIG. 4B, the method may include the following steps:

S401. A central device separately acquires identifiers of candidate bridge devices and capability information of the candidate bridge devices.

It should be noted that the communication event notification method provided in this embodiment of the present invention may be applied to a smart home system. In the smart home system, all smart homes can be interconnected and interworked by using a wired or wireless technology. Common wireless technologies may include: WiFi, Bluetooth, Zigbee, Z-wave, and the like. In this embodiment of the present invention, the smart homes in the smart home system may belong to a same local network, where the local network may be implemented by using a common wireless technology, and the candidate bridge device and the central device may also communicate with each other by using an operator network or the Internet.

In this embodiment of the present invention, a premise for implementation of communication event notification is that all devices for implementing the communication event notification method may belong to a same network, that is, a same local network. Candidate bridge devices may be all bridge devices in the same network, or may be multiple candidate bridge devices in all bridge devices, which is not limited in the present invention.

The central device separately acquires the identifiers of the candidate bridge devices and the capability information of the candidate bridge devices, that is, the central device discovers the candidate bridge devices in the local network, that is, acquires the identifiers of the candidate bridge devices; and acquires the capability information of the candidate bridge devices, to determine capabilities of the bridge devices separately.

It should be noted that capability information of a bridge device may include service information, a presenting capability, decoding information, resolution, and the like.

Optionally, the central device may search for a bridge device in the local network and acquire capability information of the bridge device in the following manners, including:

(1). A UPnP device is used to discover the bridge device. Optionally, the central device proactively searches, by using M-search, for the bridge device in the local network; acquires an identifier of the bridge device; and sends Get-Protocol( )action to acquire the capability information of the bridge device. Alternatively, the central device sends an SSDP (Simple Service Discovery Protocol, Simple Service Discovery Protocol) broadcast message to acquire the identifier of the bridge device and an address of the capability information of the bridge device; and acquire the capability information of the bridge device according to the address of the capability information.

(2). The central device sends an mDNS (multicastDNS, multicast DNS) broadcast message to acquire the identifier of the bridge device and the capability information of the bridge device directly.

It should be noted that when the central device acquires the identifiers of the candidate bridge devices and the capability information of the candidate bridge devices in the manner (1), the central device needs to be a central device having a UPnP (Universal Plug and Play, Universal Plug and Play) function. Optionally, the central device may be a central device in which UPnP protocols or a UPnP application is installed.

UPnP standards implement media sharing application in the local network, and define three entities:

(1). Media Renderer, that is, a media presenting device, which can play media content designated by a control-point device, where the media presenting device may be a device such as a TV;

(2). Media Server, that is, a media service device, which stores media content, where the media server may be a device such as a PC; and (3). Control Point, that is, a control-point device, which can search for the media content stored on the Media Server, and control the designated content to be played on the Media Renderer, where the control-point device may be a device such as a mobile phone or a television remote control.

In this embodiment of the present invention, the central device is not only a media service device but also a control-point device, and the bridge device may be a media presenting device.

Optionally, the central device may be a smartphone, a computer, a tablet computer, or the like. Bridge devices may include a smart household appliance and an electronic device, for example, a mobile phone, a mobile power supply, a tablet computer, a personal digital assistant, a computer, a media player, a smart television, a sound box, a smart refrigerator, an air conditioner, a water heater, a microwave oven, and a treadmill. The bridge device in this embodiment of the present invention may be a smart device that can send and/or receive a transmission signal. Wireless communication can be performed between the central device and the bridge device.

Optionally, the identifier of the bridge device in this embodiment of the present invention may be a name of the bridge device, an ID (Identity, identity) of the bridge device, an icon or code representing the bridge device, or the like, which is not limited in the present invention.

S402. The central device determines, from the candidate bridge devices according to the capability information of the candidate bridge devices, identifiers of multiple candidate bridge devices having an information reporting service.

After the central device separately acquires the identifiers of the candidate bridge devices and the capability information of the candidate bridge devices, the central device determines, from the candidate bridge devices according to the capability information of the candidate bridge devices, the identifiers of the multiple candidate bridge devices having the information reporting service, where the identifiers of the multiple candidate bridge devices are corresponding to the multiple candidate bridge devices.

Optionally, the capability information of the candidate bridge devices includes service information of the candidate bridge devices. Therefore, the central device can determine, from the candidate bridge devices according to the service information of the candidate bridge devices, the identifiers of the multiple candidate bridge devices having the information reporting service, that is, determine the multiple candidate bridge devices having the information reporting service, where the identifiers of the multiple candidate bridge devices are corresponding to the multiple candidate bridge devices.

It should be noted that the multiple candidate bridge devices have the information reporting service means that each candidate bridge device in the multiple candidate bridge devices can report acquired information to the central device.

S403. The central device separately subscribes to the information reporting service of the multiple candidate bridge devices according to the identifiers of the multiple candidate bridge devices.

After the central device determines, from the candidate bridge devices according to the capability information of the candidate bridge devices, the identifiers of the multiple candidate bridge devices having the information reporting service, the central device separately subscribes to a signal strength reporting service of the multiple bridge devices according to the identifiers of the multiple bridge devices.

It should be noted that in this embodiment of the present invention, that the central device separately subscribes to the information reporting service of the multiple candidate bridge devices is that the central device reports information to the multiple candidate bridge devices.

Figure 5A:
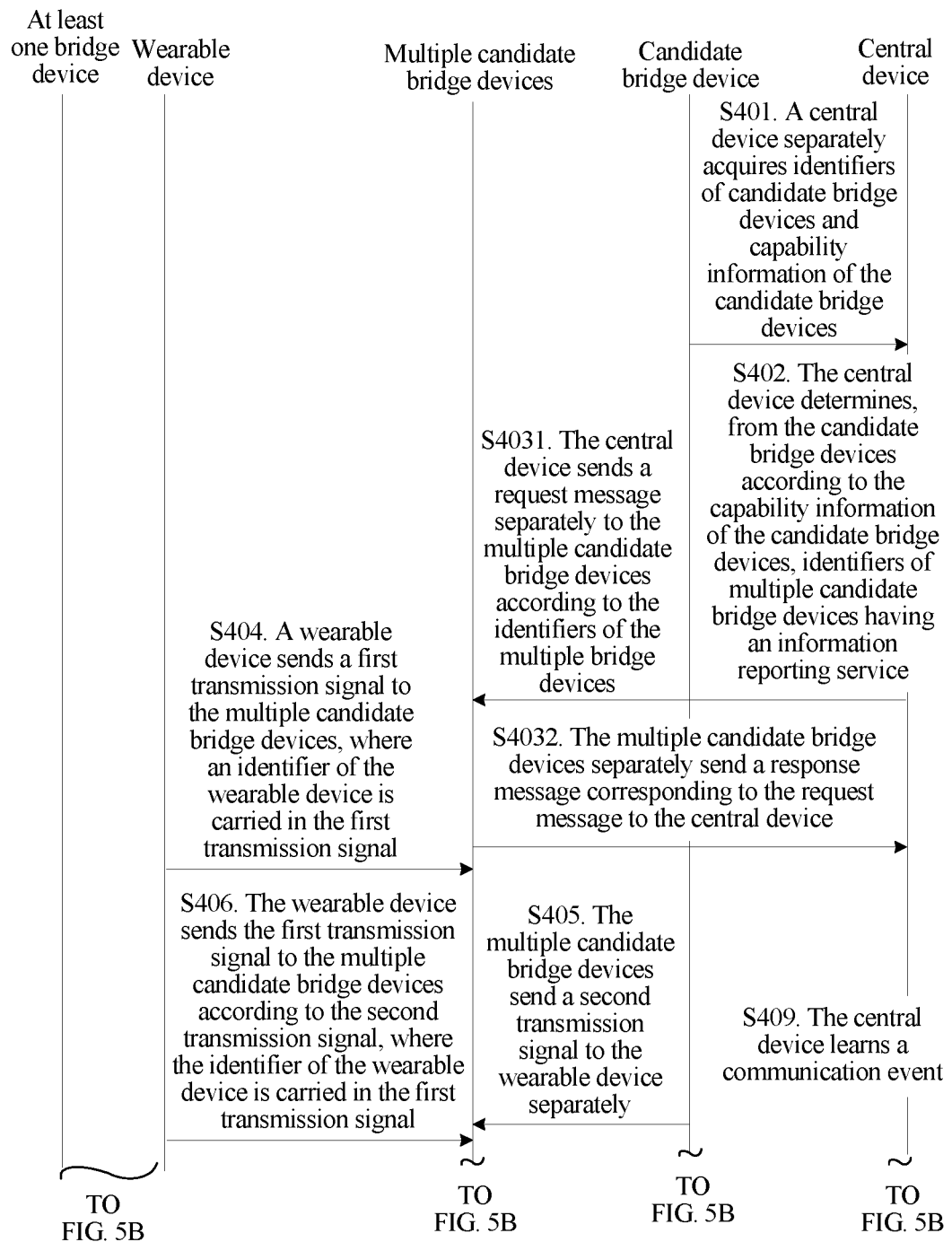
FIG. 5A and FIG. 5B are interaction diagram 2 of a communication event notification method according to an embodiment of the present invention.
Figure 5B:
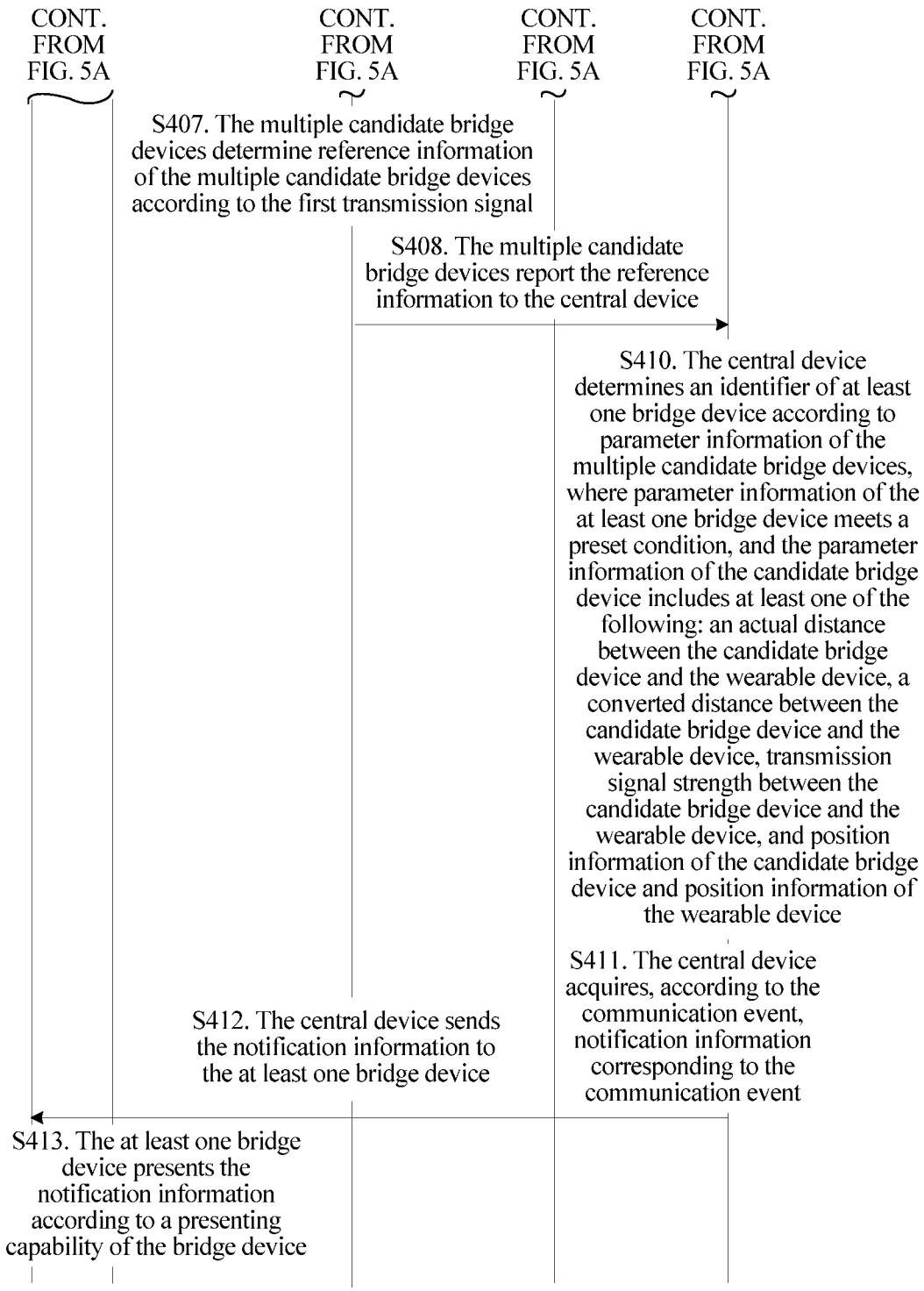

Optionally, as shown in FIG. 5A and FIG. 5B, a process in which the central device separately subscribes to the information reporting service of the multiple candidate bridge devices according to the identifiers of the multiple candidate bridge devices includes the following steps: S4031-S4032.

S4031. The central device sends a request message separately to the multiple candidate bridge devices according to the identifiers of the multiple bridge devices, where the request message is used to request the multiple candidate bridge devices to provide the information reporting service separately, where the information reporting service is: a position information reporting service, a transmission signal strength reporting service, or a position information reporting service and a transmission signal strength reporting service, where the information reporting service is the position information reporting service, and parameter information includes at least one of: an actual distance between the candidate bridge device and a wearable device, and position information of the candidate bridge device and position information of the wearable device; or the information reporting service is the transmission signal strength reporting service, and parameter information includes at least one of: a converted distance between the candidate bridge device and a wearable device, and transmission signal strength between the candidate bridge device and the wearable device; or the information reporting service is the position information reporting service and the transmission signal strength reporting service, and parameter information includes: an actual distance between the candidate bridge device and a wearable device, position information of the candidate bridge device and position information of the wearable device, and at least one of: a converted distance between the candidate bridge device and the wearable device, and transmission signal strength between the candidate bridge device and the wearable device.

It can be understood that the central device sends the request message separately to the multiple candidate bridge devices according to the identifiers of the multiple candidate bridge devices, that is, the multiple candidate bridge devices receive the request message sent separately by the central device, where the request message is used to request each bridge device in the multiple candidate bridge devices to provide the information reporting service, that is, the request message is used to request the multiple candidate bridge devices to provide the information reporting service separately.

It should be noted that the wearable device is a smart wearable device such as glasses, gloves, a watch, jewelry, apparel, or shoes. Optionally, current wearable devices include: a smartwatch, a smartband, a head-mounted display, smart shoes, an electronic drum machine T-shirt, and the like. The wearable device in this embodiment of the present invention may be a smart device that can be carried with a user and can send a first wireless broadcast signal.

It should be noted that in this embodiment of the present invention, a correspondence between a central device and a wearable device is also carried in the request message; the central device is paired with the wearable device according to the correspondence; and optionally, the central device may be paired with the wearable device by using a wireless technology, such as Bluetooth. This embodiment of the present invention constitutes no limitation on a manner of the correspondence.

Optionally, the correspondence between a central device and a wearable device may include that: one central device may be corresponding to multiple wearable devices of a user, that is, the central device is corresponding to the wearable device.

S4032. The multiple candidate bridge devices separately send a response message corresponding to the request message to the central device.

After the central device sends the request message separately to the multiple candidate bridge devices according to the identifiers of the multiple bridge devices, each candidate bridge device in the multiple candidate bridge devices sends the response message corresponding to the request message to the central device, that is, the central device subscribes to the information reporting service.

S404. The wearable device sends a first transmission signal to the multiple candidate bridge devices, where an identifier of the wearable device is carried in the first transmission signal.

After the central device subscribes to the information reporting service of the multiple candidate bridge devices separately according to the identifiers of the multiple candidate bridge devices, the wearable device sends the first transmission signal, that is, a first wireless broadcast signal, to each candidate bridge device in the multiple candidate bridge devices, where the identifier of the wearable device is carried in the first transmission signal.

Optionally, the first transmission signal may be a first Bluetooth broadcast signal.

It should be noted that because the identifier of the wearable device is carried in the first transmission signal, each candidate bridge device in the multiple candidate bridge devices can report, according to the identifier of the wearable device, signal strength of the first transmission signal to the central device corresponding to the identifier of the wearable device, that is, the central device corresponding to the wearable device.

Optionally, a manner in which the wearable device sends the first wireless broadcast signal may be periodic, for example, a period is 1 second; or may be aperiodic, that is, intermittent. An optional sending manner depends on an actual situation, which is not limited in this embodiment of the present invention.

Illustratively, a wearable device in a smart home system is A; one bridge device in multiple candidate bridge devices is a television; and the wearable device A sends a first wireless broadcast signal periodically to the television, where a period in which the wearable device A sends the first wireless broadcast signal is 10 seconds; alternatively, the wearable device A sends the first wireless broadcast signal intermittently to the television, that is, the wearable device A sends the first wireless broadcast signal to the television at an irregular time interval.

It should be noted that the wearable device sends the first wireless broadcast signal continuously, and time for sending the first wireless broadcast signal is not limited. Wireless communication can be performed between the wearable device and the central device; therefore, the wearable device can send the first wireless broadcast signal when a wireless connection between the wearable device and the central device is disconnected, and can also send the first wireless broadcast signal when the central device and the wearable device are wirelessly connected.

S405. The multiple candidate bridge devices send a second transmission signal to the wearable device separately, where a message for requesting the wearable device to send the first transmission signal is carried in the second transmission signal.

After the central device subscribes to the information reporting service of the multiple candidate bridge devices separately according to the identifiers of the multiple candidate bridge devices, the multiple candidate bridge devices send the second transmission signal to the wearable device separately, where the message for requesting the wearable device to send the transmission signal is carried in the second transmission signal.

Optionally, the second transmission signal sent separately by the multiple candidate bridge devices is a second wireless broadcast signal, where the second wireless broadcast signal may be a second Bluetooth broadcast signal.

Optionally, a manner in which the multiple candidate bridge devices send the second wireless broadcast signal separately may be periodic, for example, a period is 1 second; or may be aperiodic, that is, intermittent. An optional sending manner depends on an actual situation, which is not limited in this embodiment of the present invention.

Illustratively, a bridge device in a smart home system is a refrigerator, and a wearable device is A; and the refrigerator sends a second wireless broadcast signal to the wearable device A periodically, where a period in which the refrigerator sends the second wireless broadcast signal is 1 second; alternatively, the refrigerator sends a second wireless broadcast signal to the wearable device A intermittently, that is, the refrigerator sends the second wireless broadcast signal to the wearable device A at an irregular time interval.

S406. The wearable device sends the first transmission signal to the multiple candidate bridge devices according to the second transmission signal, where the identifier of the wearable device is carried in the first transmission signal.

After the multiple candidate bridge devices send the second transmission signal separately, that is, the second wireless broadcast signal, to the wearable device, the wearable device sends a first broadcast signal to the multiple candidate bridge devices according to the second wireless broadcast signal, where the identifier of the wearable device is carried in the first wireless broadcast signal.

Particularly, the multiple candidate bridge devices may acquire the first wireless broadcast signal sent by the wearable device in two manners: acquiring proactively and acquiring passively. Step S404 is a manner in which the multiple candidate bridge devices passively acquire the first wireless broadcast signal sent by the wearable device. Steps S405-S406 is a manner in which the multiple candidate bridge devices proactively acquire the first wireless broadcast signal sent by the wearable device.

It should be noted that steps S404 and S405-S406 are two parallel steps subsequent to step S403, that is, in this embodiment of the present invention, either step S404 or steps S405-S406 are performed after step S403, which is not limited in the present invention.

S407. The multiple candidate bridge devices determine reference information of the multiple candidate bridge devices according to the first transmission signal, where the reference information of the multiple candidate bridge devices includes: position information of the bridge device and position information of the wearable device, or includes transmission signal strength of the transmission signal, or includes position information of the bridge device, position information of the wearable device, and transmission signal strength.

After the wearable device sends the first broadcast signal to the multiple candidate bridge devices, or after the wearable device sends the first broadcast signal to the multiple candidate bridge devices according to the second wireless broadcast signal, the multiple candidate bridge devices determine reference information of each bridge device in the multiple candidate bridge devices according to the first transmission signal, where the reference information of each bridge device includes: the position information of each bridge device and the position information of the wearable device, or the transmission signal strength of the transmission signal, or the position information of each bridge device, the position information of the wearable device, and the transmission signal strength.

It should be noted that the position information of the wearable device and the transmission signal strength of the transmission signal that are included in the reference information are determined by the candidate bridge device according to the first transmission signal, that is, the first broadcast signal.

Optionally, each bridge device in the multiple candidate bridge devices measures, according to the first transmission signal, the transmission signal strength of the first transmission signal to determine the transmission signal strength; and each bridge device in the multiple bridge devices reports the position information of the wearable device and the position information of each bridge device in the multiple candidate bridge devices separately to the central device according to the identifier of the wearable device.

Optionally, the position information of the wearable device and the position information of each bridge device may be position coordinates of the wearable device and position coordinates of each bridge device, or may be longitude and latitude of the wearable device and longitude and latitude of each bridge device, which is not limited in the present invention.

Optionally, when the multiple candidate bridge devices have the information reporting service, where the information reporting service is: the position information reporting service, the transmission signal strength reporting service, or the position information reporting service and the transmission signal strength reporting service, the multiple candidate bridge devices may acquire the position information corresponding to the wearable device that sends the first transmission signal, and the position information of each bridge device in the multiple bridge devices, or acquire the transmission signal strength of the transmission signal.

It should be noted that steps S404-S407 and steps S405-S406-S407 may be steps that are continuously performed in a smart home system, that is, steps S404-S407 and steps S405-S406-S407 are performed continuously in a process of the communication event notification method provided in this embodiment of the present invention.

S408. The multiple candidate bridge devices report the reference information to the central device.

After the multiple candidate bridge devices determine the reference information of the multiple candidate bridge devices according to the first transmission signal, the multiple candidate bridge devices may report the reference information to the central device separately according to the identifier of the wearable device, where the reference information is: the position information of the wearable device, the position information of each bridge device in the multiple candidate bridge devices, and/or the transmission signal strength, where the identifiers of the multiple candidate bridge devices are corresponding to the reported reference information respectively.

Optionally, each bridge device in the multiple candidate bridge devices may determine, according to an identifier of one wearable device and a correspondence between the wearable device and a central device, an identifier of the central device corresponding to the wearable device. Each bridge device in the multiple candidate bridge devices reports the transmission signal strength of the first transmission signal and the identifier of each bridge device in the multiple candidate bridge devices to the central device according to the identifier of the central device.

It should be noted that the multiple bridge devices report the reference information as an event to the central device.

Optionally, the multiple candidate bridge devices may report the transmission signal strength of the first transmission signal and the identifiers of the multiple candidate bridge devices separately to any central device according to the identifier of the wearable device. When a central device acquires the transmission signal strength, reported by any bridge device, of the first transmission signal that is sent by one wearable device, and if the central device is not corresponding to the wearable device, that is, the wearable device is not a wearable device with which the central device is paired, the central device ignores the event, and no processing is performed.

S409. The central device learns of a communication event.

Optionally, the central device may be a user equipment, a bridge device, or a wearable device.

In this embodiment of the present invention, the central device learns of the communication event; when the central device is a user equipment, the user equipment may receive a communication event sent by another user equipment, where the communication event may be a call, a short message or voice chat information, an instant message, information pushing, or the like; when the central device is a bridge device or a wearable device, the bridge device or the wearable device receives the communication event; alternatively, the bridge device or the wearable device may not receive the communication event directly, but can learn that the communication event is received by the user equipment.

Optionally, the user equipment may be an electronic device such as a smartphone, a computer, or a tablet computer, and the central device may be a device that can learn of a communication event, which is not limited in the present invention.

It should be noted that after the central device learns of the communication event, the multiple candidate bridge devices report the reference information, where the reference information is reported by the multiple candidate bridge devices most recently, that is, step S409 may be performed before step S408 is performed. As such, the present invention constitutes no limitation on a sequence of performing step S408 and step S409.

Optionally, steps S404-S408 are steps that are performed continuously and circularly in this embodiment of the present invention. Step S409 may be performed at any step between step S404 and step S408, which is not limited in the present invention.

S410. The central device determines an identifier of at least one bridge device according to parameter information of the multiple candidate bridge devices, where parameter information of the at least one bridge device meets a preset condition, and the parameter information of the candidate bridge device includes at least one of the following: the actual distance between the candidate bridge device and the wearable device, the converted distance between the candidate bridge device and the wearable device, the transmission signal strength between the candidate bridge device and the wearable device, and the position information of the candidate bridge device and the position information of the wearable device.

In this embodiment of the present invention, after the central device learns of the communication event, the central device may determine the identifier of the at least one bridge device according to the parameter information of the multiple candidate bridge devices, where parameter information of the at least one bridge device meets the preset condition, and the parameter information of the candidate bridge device includes at least one of the following: the actual distance between the candidate bridge device and the wearable device, the converted distance between the candidate bridge device and the wearable device, the transmission signal strength between the candidate bridge device and the wearable device, and the position information of the candidate bridge device and the position information of the wearable device, where the wearable device is corresponding to the central device.

Optionally, after the central device acquires the communication event, the central device may acquire an identifier, determined most recently, of at least one bridge device of which parameter information meets the preset condition, where the identifier, determined by the central device, of the at least one bridge device may be determined at a last time by the central device before the central device acquires the communication event, and is then learned of by the user equipment after receiving the communication event; or may be determined by the central device after the central device learns of the communication event.

Particularly, in this embodiment of the present invention, the central device determines an identifier of at least one bridge device continuously, where the identifier of the at least one bridge device is an identifier corresponding to at least one bridge device of which parameter information meets the preset condition.

Optionally, when the central device can receive the communication event, the central device is corresponding to the wearable device. One central device may be corresponding to multiple wearable devices of a user, that is, the central device is corresponding to the wearable device. In this embodiment of the present invention, that the central device is corresponding to the wearable device may be that the central device is paired with the wearable device, and this embodiment of the present invention constitutes no limitation on a manner of a correspondence.

It should be noted that a person skilled in the art may understand that when a distance between the candidate bridge device and the wearable device becomes shorter, the transmission signal strength of the first transmission signal that is received by the candidate bridge device and sent by the wearable device becomes stronger. Therefore, the transmission signal strength of the first transmission signal may also be used to represent a distance between the candidate bridge device and the wearable device.

It should be noted that after acquiring the reference information of the multiple bridge devices, the central device determines, according to the reference information, parameter information corresponding to the reference information.

Optionally, the central device acquires the position information of the wearable device, the position information of each bridge device in the multiple candidate bridge devices, and/or the transmission signal strength; the central device determines the actual distance between the candidate bridge device and the wearable device according to the position information of the wearable device, the position information of each bridge device in the multiple candidate bridge devices; and the central device calculates the converted distance between the candidate bridge device and the wearable device according to the transmission signal strength. That is, the actual distance between the candidate bridge device and the wearable device is determined, by the central device after acquiring the position information of the candidate bridge device and the position information of the wearable device that are reported by the candidate bridge device, according to the position information of the candidate bridge device and the position information of the wearable device; the transmission signal strength between the candidate bridge device and the wearable device is determined by the central device after acquiring information reported by the candidate bridge device; and the converted distance between the candidate bridge device and the wearable device is obtained by the central device through calculation according to the transmission signal strength.

Optionally, the parameter information is at least one of: the actual distance and the converted distance, and the preset condition includes a first preset condition, where the first preset condition is that the distance is shortest or the distance is less than a first preset threshold; or the parameter information is the transmission signal strength, and the preset condition includes a second preset condition, where the second preset condition is that the signal strength is strongest or the signal strength is greater than a second preset threshold; or the parameter information is the position information of the candidate bridge device and the position information of the wearable device, and the preset condition includes a third preset condition, where the third preset condition is that a preset geographical scope is met.

Optionally, the parameter information further includes a presenting capability, and the preset condition further includes a fourth preset condition, where the fourth preset condition is that an image is presented, or an image and a sound are presented, and that parameter information of the at least one bridge device meets a preset condition includes that:

The actual distance meets the first preset condition, and the presenting capability meets the fourth preset condition; or the converted distance meets the first preset condition, and the presenting capability meets the fourth preset condition; or the transmission signal strength meets the second preset condition, and the presenting capability meets the fourth preset condition; or the position information of the candidate bridge device and the position information of the wearable device meet the third preset condition, and the presenting capability meets the fourth preset condition; or the actual distance meets the first preset condition, the transmission signal strength meets the second preset condition, and the presenting capability meets the fourth preset condition; or the converted distance meets the first preset condition, the transmission signal strength meets the second preset condition, and the presenting capability meets the fourth preset condition; or the actual distance meets the first preset condition, the position information of the candidate bridge device and the position information of the wearable device meet the third preset condition, and the presenting capability meets the fourth preset condition; or the converted distance meets the first preset condition, the position information of the candidate bridge device and the position information of the wearable device meet the third preset condition, and the presenting capability meets the fourth preset condition.

Optionally, that parameter information of the at least one bridge device meets a preset condition may further include at least one of that: the actual distance or the converted distance meets the first preset condition, the position information of the candidate bridge device and the position information of the wearable device meet the third preset condition, and the transmission signal strength meets the second preset condition; and include that the presenting capability meets the fourth preset condition.

Optionally, that the central device determines an identifier of at least one bridge device according to parameter information of the multiple candidate bridge devices includes the following several situations:

(1). The central device determines an identifier of at least one bridge device whose actual distance from the wearable device is shortest.

After the central device learns of the communication event, the central device determines the identifier of the at least one bridge device whose distance from the wearable device is shortest, where the identifier of the at least one bridge device is determined by the central device most recently.

Optionally, the central device acquires the actual distance between each bridge device in the multiple candidate bridge devices and the wearable device separately according to the acquired position information of each bridge device in the multiple candidate bridge devices and the acquired position information of the wearable device, and determines the identifier of the at least one bridge device whose actual distance from the wearable device is shortest.

It should be noted that the central device may determine the identifier of the at least one bridge device before the central device learns of the communication event or after the central device learns of the communication event, which is not limited in the present invention. That is, the central device determines the identifier of the at least one bridge device, and after the central device learns of the communication event, the central device acquires an identifier, determined most recently, of at least one bridge device; alternatively, after the central device acquires the communication event, the central device determines the identifier of the at least one bridge device and acquires the identifier of the at least one bridge device.

(2). The central device determines an identifier of at least one bridge device whose converted distance from the wearable device is shortest.

After the central device learns of the communication event, the central device determines the identifier of the at least one bridge device whose converted distance from the wearable device is shortest, where the identifier of the at least one bridge device is determined by the central device most recently.

Optionally, that the central device determines an identifier of at least one bridge device includes that: the central device separately calculates the converted distance between each bridge device in the multiple candidate bridge devices and the wearable device according to the acquired identifiers of the multiple candidate bridge devices and the transmission signal strength reported separately by the multiple candidate bridge devices, and determines the identifier of the at least one bridge device whose converted distance from the wearable device is shortest, where the transmission signal strength reported separately by the multiple candidate bridge devices is the signal strength of the first transmission signal that is received separately by the multiple candidate bridge devices and is sent by the wearable device.

It should be noted that the central device may determine the identifier of the at least one bridge device before the central device learns of the communication event or after the central device learns of the communication event, which is not limited in the present invention. That is, the central device determines the identifier of the at least one bridge device, and after the central device learns of the communication event, the central device acquires an identifier, determined most recently, of at least one bridge device; alternatively, after the central device learns of the communication event, the central device determines the identifier of the at least one bridge device and acquires the identifier of the at least one bridge device.

Optionally, the central device calculates the converted distance between each bridge device in the multiple candidate bridge devices and the wearable device according to the transmission signal strength reported by each bridge device in the multiple candidate bridge devices, where the converted distance may be obtained by using a calculation formula.

For example, the calculation formula may be a signal free space attenuation formula, or may be another formula by which the distance can be calculated according to a signal. Using the signal free space attenuation formula as an example, one manifestation form of the signal free space attenuation formula is: $P\_RX=P\_TX/d^n$, where P_RX represents receive power, a unit of which is W/mW (watt/milliwatt), P_TX represents transmit power, a unit of which is W/mW, d represents a distance, a unit of which is m (meter), and n is an integer parameter, a value of which may be between 2-6.

Illustratively, signal strength, reported by a television, of a first wireless broadcast signal sent by a wearable device 1 is 50 dBM (decibel relative to one milliwatt); transmission signal strength, reported by a refrigerator, of the first wireless broadcast signal sent by the wearable device 1 is 40 dBM; and transmission signal strength, reported by a microwave oven, of the first wireless broadcast signal sent by the wearable device 1 is 60 dBM. The wearable device 1 is paired with a central device 1 by using Bluetooth; a converted distance between the television and the wearable device 1, a converted distance between the refrigerator and the wearable device 1, and a converted distance between the microwave oven and the wearable device 1 are calculated by using a calculation formula between transmission signal strength and a distance; and then, the central device 1 compares the converted distances between the wearable device 1 and the television, the refrigerator, and the microwave oven separately. The transmission signal strength is inversely proportional to the distance, that is, stronger transmission signal strength indicates a shorter converted distance, and therefore, the central device determines the microwave oven whose converted distance from the wearable device 1 is shortest.

(3). The central device receives an identifier of at least one bridge device that reports the strongest transmission signal strength of the first transmission signal sent by the wearable device.

After the central device learns of the communication event, the central device receives the identifier of the at least one bridge device that reports the strongest transmission signal strength of the first transmission signal (the first wireless broadcast signal) sent by the wearable device, where the identifier of the at least one bridge device is determined by the central device most recently.

Optionally, that the central device determines an identifier of at least one bridge device includes that: the central device determines, after comparing acquired transmission signal strength reported by each bridge device in the multiple candidate bridge devices, an identifier of at least one bridge device corresponding to at least one strongest transmission signal strength, where the at least one bridge device is corresponding to the identifier of the at least one bridge device that reports the at least one strongest transmission signal strength, and the at least one bridge device is a bridge device between which and the wearable device transmission signal strength is strongest.

Illustratively, signal strength, reported by a television, of a first wireless broadcast signal sent by a wearable device 1 is 50 dBM; signal strength, reported by a refrigerator, of the first wireless broadcast signal sent by the wearable device 1 is 40 dBM; and signal strength, reported by a microwave oven, of the first wireless broadcast signal sent by the wearable device 1 is 60 dBM. The wearable device 1 is paired with a central device 1 by using Bluetooth. With 60>50>40, the central device determines the microwave oven between which and the wearable device 1 transmission signal strength is strongest.

It should be noted that the central device may determine the identifier of the at least one bridge device before the central device learns of the communication event or after the central device learns of the communication event, which is not limited in the present invention. That is, the central device determines the identifier of the at least one bridge device, and after the central device learns of the communication event, the central device acquires an identifier, determined most recently, of at least one bridge device; alternatively, after the central device learns of the communication event, the central device determines the identifier of the at least one bridge device and acquires the identifier of the at least one bridge device.

(4). The central device acquires an identifier of at least one bridge device whose actual distance from the wearable device is less than the first preset threshold.

After the central device learns of the communication event, the central device acquires the identifier of the at least one bridge device whose actual distance from the wearable device is less than the first preset threshold, where the identifier of the at least one bridge device is determined by the central device most recently.

Optionally, the central device acquires an identifier of at least one bridge device whose actual distance from the wearable device is less than the first preset threshold and that has a presenting capability of presenting an image or presenting an image and a sound, where the identifier of the at least one bridge device is determined by the central device most recently.

Optionally, the first preset threshold may be 10 meters, and a value of the first preset threshold may be set according to an actual situation, which is not limited in the present invention.

Preferably, the presenting capability may be a media playback capability, where the media playback capability is a capability of presenting an image or presenting an image and a sound; and may also include a capability of supporting TTS.

It can be understood that a bridge device having the presenting capability can not only display information, but also play the information by sound; such a bridge device has a better communication event notification capability, thereby improving user experience.

Optionally, that the central device determines an identifier of at least one bridge device includes that: the central device separately acquires the actual distance between each bridge device in the multiple candidate bridge devices and the wearable device according to the acquired position information of each bridge device in the multiple candidate bridge devices and the acquired position information of the wearable device, such as position coordinates or longitude and latitude, and compares the actual distance between each bridge device in the multiple candidate bridge devices and the wearable device with the first preset threshold, to determine identifiers of m bridge devices whose actual distance from the wearable device is less than the first preset threshold, and select, from the identifiers of the m bridge devices, an identifier of at least one bridge device that has the capability of presenting an image or presenting an image and a sound, and supporting TTS, where m≥1.

Optionally, the central device separately selects, from the identifiers of the m candidate bridge devices according to presenting capabilities of the multiple candidate bridge devices, the identifier of the at least one bridge device corresponding to the capability of presenting an image or presenting an image and a sound, and supporting TTS.

Optionally, the capability information, acquired by the central device, of the multiple candidate bridge devices includes the presenting capabilities of the multiple candidate bridge devices, where the presenting capability is media playback capability information that can be presented by the bridge device, and the media playback capability information includes supporting a video, audio, and TTS.

It can be understood that in a smart home system, the central device may present, by using at least one bridge device, notification information corresponding to the communication event, and the at least one bridge device is at least one bridge device that is determined by the central device from the candidate bridge device and of which parameter information meets the preset condition, that is, the central device can select at least one bridge device of which the actual distance between the candidate bridge device and the wearable device meets the preset condition; therefore, a problem that a function of notifying a user by a smart television is subject to a geographical restriction and a problem that a function of notifying a user by a wearable device is subject to a distance restriction can be resolved, thereby reducing a risk of communication event notification and improving user experience.

(5). The central device determines an identifier of at least one bridge device whose converted distance from the wearable device is less than the first preset threshold.

After the central device learns of the communication event, the central device determines the identifier of the at least one bridge device whose converted distance from the wearable device is less than the first preset threshold, where the identifier of the at least one bridge device is determined by the central device most recently.

Optionally, the central device determines an identifier of at least one bridge device whose converted distance from the wearable device is less than the first preset threshold and that has a presenting capability of presenting an image or presenting an image and a sound, where the identifier of the at least one bridge device is determined by the central device most recently.

Optionally, the first preset threshold may be 10 meters, and a value of the first preset threshold may be set according to an actual situation, which is not limited in the present invention.

Preferably, a first media presenting capability may be a media playback capability, where the media playback capability is a capability of presenting a video and audio and supporting TTS (Text To Speech, text to speech), that is, a capability of playing a text by sound.

It can be understood that a bridge device having the presenting capability can not only display information, but also play the information by sound; such a bridge device has a better communication event notification capability, thereby improving user experience.

Optionally, that the central device determines an identifier of at least one bridge device includes that: the central device calculates the converted distance between each bridge device in the multiple candidate bridge devices and the wearable device according to the acquired transmission signal strength reported by each bridge device in the multiple candidate bridge devices, and compares the converted distance between each bridge device in the multiple candidate bridge devices and the wearable device with the first preset threshold, to determine identifiers of n bridge devices whose distance from the wearable device is less than the first preset threshold, and select, from the identifiers of the n bridge devices, an identifier of at least one bridge device that has the presenting capability, where n≥1.

Illustratively, transmission signal strength, reported by a television, of a first wireless broadcast signal sent by a wearable device 1 is 50 dBM; transmission signal strength, reported by a refrigerator, of the first wireless broadcast signal sent by the wearable device 1 is 40 dBM; and transmission signal strength, reported by a microwave oven, of the first wireless broadcast signal sent by the wearable device 1 is 60 dBM. The wearable device 1 is paired with a central device 1 by using Bluetooth; a converted distance between the television and the wearable device 1, a converted distance between the refrigerator and the wearable device 1, and a converted distance between the microwave oven and the wearable device 1 are calculated by using a calculation formula between transmission signal strength and a distance; and then, the central device 1 compares the converted distances between the wearable device 1 and the television, the refrigerator, and the microwave oven separately with the first preset threshold, 10 meters. It is assumed that the converted distance between the television and the wearable device 1 is 9 meters, the converted distance between the refrigerator and the wearable device 1 is 11 meters, and the converted distance between the microwave oven and the wearable device 1 is 5 meters. Because 5 meters are less than 10 meters, 9 meters are less than 10 meters, and 11 meters are greater than 10 meters, the central device determines the television and the microwave whose converted distances from the wearable device 1 are less than the first preset threshold; in addition, the television can present an image and a sound, and the microwave oven can present a sound; therefore, the central device determines, from the television and the microwave oven, that the television is the at least one bridge device having the capability of presenting an image and a sound.

It should be noted that the central device may determine the identifier of the at least one bridge device before the central device learns of the communication event or after the central device learns of the communication event, which is not limited in the present invention. That is, the central device determines the identifier of the at least one bridge device, and after the central device learns of the communication event, the central device acquires an identifier, determined most recently, of at least one bridge device; alternatively, after the central device learns of the communication event, the central device determines the identifier of the at least one bridge device and acquires the identifier of the at least one bridge device.

It can be understood that in a smart home system, the central device may present, by using at least one bridge device, notification information corresponding to the communication event, and the at least one bridge device is at least one bridge device that is determined by the central device from the candidate bridge device and of which parameter information meets the preset condition, that is, the central device can select at least one bridge device of which the converted distance between the candidate bridge device and the wearable device meets the preset condition; therefore, a problem that a function of notifying a user by a smart television is subject to a geographical restriction and a problem that a function of notifying a user by a wearable device is subject to a distance restriction can be resolved, thereby reducing a risk of communication event notification and improving user experience.

(6). The central device determines an identifier of at least one bridge device that reports transmission signal strength, greater than the second preset threshold, of the first transmission signal sent by the wearable device.

After the central device learns of the communication event, the central device acquires the identifier of the at least one bridge device that reports the transmission signal strength, greater than the second preset threshold, of the first transmission signal, that is, the first wireless broadcast signal, sent by the wearable device, where the identifier of the at least one bridge device is determined by the central device most recently.

Optionally, the central device determines an identifier of at least one bridge device that reports the signal strength, greater than the second preset threshold, of the first wireless broadcast signal and has a presenting capability of presenting an image or presenting an image and a sound.

Preferably, the presenting capability may be a media playback capability, where the media playback capability is a capability of presenting a video and audio; and may also include a capability of supporting TTS.

It can be understood that a bridge device having the presenting capability can not only display information, but also play the information by sound; such a bridge device has a better communication event notification capability, thereby improving user experience.

Optionally, the central device determines, after comparing each acquired transmission signal strength reported by each bridge device in the multiple candidate bridge devices with the second preset threshold, identifiers of k bridge devices corresponding to transmission signal strength greater than the second preset threshold, and selects, from the identifiers of the k bridge devices, an identifier of at least one bridge device having the capability of presenting an image, or presenting an image and a sound, or supporting TTS, where the at least one bridge device is corresponding to the identifier of the at least one bridge device that reports the transmission signal strength greater than the second preset threshold and that has the foregoing presenting capability, and the at least one bridge device is a bridge device between which and the wearable device transmission signal strength is greater than the second preset threshold, where k>1.

Optionally, the second preset threshold may be 45 dBM, and a value of the second preset threshold may be set according to an actual situation, which is not limited in the present invention.

Optionally, the central device separately selects, from the identifiers of the k bridge devices according to presenting capabilities of the multiple candidate bridge devices, the identifier of the at least one bridge device corresponding to the capability of presenting an image, or presenting an image and a sound, or supporting TTS.

Optionally, the capability information, acquired by the central device, of the multiple candidate bridge devices includes the presenting capabilities of the multiple candidate bridge devices, where the media presenting capability is media playback capability information that can be presented by the bridge device, and the media playback capability information includes supporting a video, audio, and TTS.

Illustratively, transmission signal strength, reported by a television, of a first wireless broadcast signal sent by a wearable device 1 is 50 dBM; transmission signal strength, reported by a refrigerator, of the first wireless broadcast signal sent by the wearable device 1 is 40 dBM; and transmission signal strength, reported by a microwave oven, of the first wireless broadcast signal sent by the wearable device 1 is 60 dBM. A central device 1 compares the transmission signal strength, reported separately by the television, the refrigerator, and the microwave oven, of the first wireless broadcast signal with the second preset threshold, 45 dBM. Because 40 dBM is less than 45 dBM, 50 dBM is greater than 45 dBM, and 60 dBM is greater than 45 dBM, the central device determines the television and the microwave oven that are corresponding to the transmission signal strength greater than the second preset threshold; in addition, the television can present a video and audio, and the microwave oven can present audio; therefore, the central device determines, from the television and the microwave oven, that the television is the at least one bridge device having more presenting capabilities.

Particularly, the central device may determine the identifier of the at least one bridge device before the central device learns of the communication event or after the central device learns of the communication event, which is not limited in the present invention. That is, the central device determines the identifier of the at least one bridge device, and after the central device learns of the communication event, the central device acquires an identifier, determined most recently, of at least one bridge device; alternatively, after the central device learns of the communication event, the central device determines the identifier of the at least one bridge device and acquires the identifier of the at least one bridge device.

(7). The central device determines an identifier of at least one bridge device that reports position information of the candidate bridge device and position information of the wearable device that meet a preset geographical scope.

After the central device learns of the communication event, the central device determines the identifier of the at least one bridge device that reports the position information of the candidate bridge device and the position information of the wearable device that meet the preset geographical scope.

Optionally, the central device determines, according to the acquired position information of the candidate bridge device and the acquired position information of the wearable device, whether the candidate bridge device and the wearable device are located in a same geographical scope, that is, whether the position information of the candidate bridge device and the position information of the wearable device meet the preset geographical scope. The geographical scope may refer to a house or an area, and may be set according to an actual situation, which is not limited in the present invention.

Optionally, the position information of the candidate bridge device and the position information of the wearable device may be position coordinates of the candidate bridge device and position coordinates of the wearable device; or may be longitude and latitude of the candidate bridge device and longitude and latitude of the wearable device; or may further be other information that can represent positions of the candidate bridge device and the wearable device, which is not limited in the present invention.

Optionally, when it is met that: the actual distance meets the first preset condition, the transmission signal strength meets the second preset condition, and the presenting capability meets the fourth preset condition; or the converted distance meets the first preset condition, the transmission signal strength meets the second preset condition, and the presenting capability meets the fourth preset condition; or the actual distance or the converted distance meets the first preset condition, the transmission signal strength meets the second preset condition, and the presenting capability meets the fourth preset condition; or the actual distance meets the first preset condition, the position information of the candidate bridge device and the position information of the wearable device meet the third preset condition, and the presenting capability meets the fourth preset condition; or the converted distance meets the first preset condition, the position information of the candidate bridge device and the position information of the wearable device meet the third preset condition, and the presenting capability meets the fourth preset condition, with reference to the foregoing situations (1), (2), (3), (4), (5), (6), and (7), that is, when at least one of that: the actual distance or the converted distance meets the first preset condition, the position information of the candidate bridge device and the position information of the wearable device meet the third preset condition, the transmission signal strength meets the second preset condition is met; and the presenting capability meets the fourth preset condition, the central device determines an identifier of at least one corresponding bridge device. A manner of the determining is the same as the foregoing process, and details are not described herein.

S411. The central device acquires, according to the communication event, notification information corresponding to the communication event.

After the central device learns of the communication event, the central device acquires, according to the communication event, the notification information corresponding to the communication event.

Optionally, the central device acquires, according to an identifier of each bridge device in at least one bridge device and the communication event, notification information separately corresponding to the communication event and each bridge device in the at least one bridge device.

Optionally, the central device searches, according to the identifier of each bridge device in the at least one bridge device, for a presenting capability of each bridge device in the at least one bridge device respectively corresponding to the identifier of each bridge device in the at least one bridge device; and the central device acquires, according to the presenting capability of each bridge device in the at least one bridge device and the communication event, the notification information corresponding to the communication event and each bridge device in the at least one bridge device.

Illustratively, the central device is a mobile phone; it is assumed that the mobile phone receives a short message, the identifier of the at least one bridge device is a television and a refrigerator, a presenting capability of the television is video and audio, and a presenting capability of the refrigerator is audio. Therefore, the mobile phone acquires a ringtone of the short message according to the short message and the presenting capability of the television, and the mobile phone acquires the ringtone of the short message and a number of the incoming short message according to the short message and the presenting capability of the refrigerator, where if the refrigerator further supports a TTS technology, the central device acquires the ringtone of the short message, the number of the incoming short message, and short message content according to the presenting capability of the refrigerator.

Particularly, when the central device acquires, according to the communication event, the notification information corresponding to the communication event, the notification information may further be notification information that is not corresponding to the presenting capability of each bridge device in the at least one bridge device, that is, the central device acquires, according to the communication event, the notification information corresponding to the communication event.

Illustratively, the central device is a mobile phone; it is assumed that the mobile phone receives a short message, the identifier of the at least one bridge device is a television and a refrigerator, and the mobile phone acquires a ringtone of the short message, a number of the incoming short message, and short message content according to the short message.

S412. The central device sends the notification information to the at least one bridge device.

After the central device acquires, according to the communication event, the notification information corresponding to the communication event, and the central device determines the identifier of the at least one bridge device according to the parameter information of the multiple candidate bridge devices, the central device sends, according to the identifier of the at least one bridge device, the notification information corresponding to the communication event to the at least one bridge device.

It should be noted that the central device may send same notification information to the at least one bridge device, or may send notification information respectively corresponding to a presenting capability of the at least one bridge device to the at least one bridge device, where an implementation manner may be set according to an actual situation, which is not limited in the present invention.

S413. The at least one bridge device presents the notification information according to a presenting capability of the bridge device.

After the central device sends the notification information to the at least one bridge device, the at least one bridge device presents the notification information according to the presenting capability of the bridge device.

It should be noted that a form of the notification information presented by the at least one bridge device is corresponding to the presenting capability of the at least one bridge device. Therefore, after the at least one bridge device acquires the notification information, the at least one bridge device presents information, corresponding to the presenting capability of the at least one bridge device, in the notification information. The present invention constitutes no limitation on a presenting manner of the at least one bridge device.

Illustratively, the central device is a mobile phone, if the mobile phone acquires a ringtone of a short message, a number of the incoming short message, and short message content according to the short message and a presenting capability of the television, and the mobile phone acquires the ringtone of the short message according to the short message and a presenting capability of the refrigerator, the television displays and broadcasts the ringtone of the short message, the number of the incoming short message, and the short message content, and the refrigerator plays the ringtone of the short message. If the mobile phone acquires the ringtone of the short message, the number of the incoming short message, and the short message content according to the short message, the television displays and broadcasts the ringtone of the short message, the number of the incoming short message, and the short message content according to the presenting capability of the television, and the television plays the ringtone of the short message according to the presenting capability of the television.

Optionally, the communication event notification method provided in this embodiment of the present invention is not merely limited to the foregoing implementation process illustrated in this embodiment.

It should be noted that a method for completing communication event notification by locating a position of a wearable device and presenting notification information on a bridge device that is relatively close to the wearable device may further include the following:

A positioning device performs modeling on a structural diagram of a house, or a user carries a positioning device that draws an electronic map of a house by using a technology such as a magnetic field or an inertial sensor; and position coordinates or longitude and latitude of all bridge devices are marked on the electronic map. In addition, the wearable device detects, by using a sensor device on the wearable device, position coordinates or longitude and latitude of the user, that is, position coordinates or longitude and latitude of the wearable device, and sends the position coordinates or longitude and latitude of the wearable device to the positioning device. The positioning device sends the position coordinates or longitude and latitude of the wearable device and the position coordinates or longitude and latitude of the bridge devices to the central device, and the central device determines at least one bridge device according to the position coordinates or longitude and latitude of the wearable device and the position coordinates or longitude and latitude of the bridge devices. When the central device learns of a communication event, the central device sends notification information that is acquired according to the communication event to the at least one bridge device, and finally, the at least one bridge device presents the notification information.

It should be noted that the positioning device and the central device may also be a same device.

Optionally, the positioning device may be an electronic device such as a router, a mobile phone, or a tablet, or may be a positioning module on the electronic device.

It should be noted that in this embodiment of the present invention, all of the central device, the wearable device, and the bridge device are in a switched-on or powered-on state.

According to the communication event notification method provided in this embodiment of the present invention, a central device learns of a communication event; the central device determines an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device; and finally, the central device sends, according to the identifier of the at least one bridge device, notification information corresponding to the communication event to the at least one bridge device, so that the at least one bridge device presents the notification information. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Embodiment 3

Figure 6:
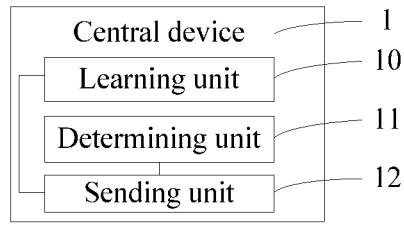
FIG. 6 is schematic structural diagram 1 of a central device according to an embodiment of the present invention.

As shown in FIG. 6, this embodiment of the present invention provides a central device 1, which is corresponding to a communication event notification method on a central device side. The central device 1 may include a learning unit 10, a determining unit 11, and a sending unit 12.

The learning unit 10 is configured to learn of a communication event.

The determining unit 11 is configured to determine an identifier of at least one bridge device according to parameter information of a candidate bridge device, where parameter information of the at least one bridge device meets a preset condition, and the parameter information of the candidate bridge device includes at least one of the following:

an actual distance between the candidate bridge device and a wearable device;

a converted distance between the candidate bridge device and the wearable device; and transmission signal strength between the candidate bridge device and the wearable device, and position information of the candidate bridge device and position information of the wearable device.

The sending unit 12 is configured to send, according to the identifier that is determined by the determining unit 11 and that is of the at least one bridge device, notification information corresponding to the communication event learned of by the learning unit 10 to the at least one bridge device, so that the at least one bridge device presents the notification information.

Optionally, the parameter information is at least one of: the actual distance and the converted distance, and the preset condition includes a first preset condition, where the first preset condition is that the distance is shortest or the distance is less than a first preset threshold; or the parameter information is the transmission signal strength, and the preset condition includes a second preset condition, where the second preset condition is that the signal strength is strongest or the signal strength is greater than a second preset threshold; or the parameter information is the position information of the candidate bridge device and the position information of the wearable device, and the preset condition includes a third preset condition, where the third preset condition is that a preset geographical scope is met.

Figure 7:
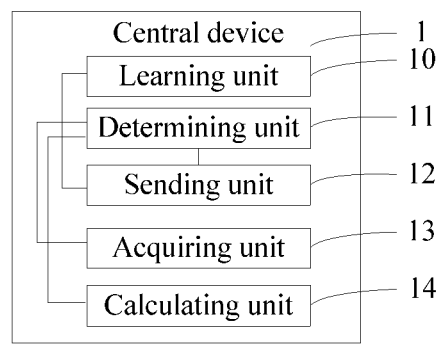
FIG. 7 is schematic structural diagram 2 of a central device according to an embodiment of the present invention.

Optionally, as shown in FIG. 7, the central device 1 further includes an acquiring unit 13 and a calculating unit 14.

The actual distance is determined, after the acquiring unit 13 acquires the position information of the candidate bridge device and the position information of the wearable device that are reported by the candidate bridge device, by the determining unit 11 according to the position information of the candidate bridge device and the position information of the wearable device that are acquired by the acquiring unit 13.

The transmission signal strength is determined by the determining unit 11 according to information that is reported by the candidate bridge device and acquired by the acquiring unit 13.

The converted distance is obtained by the calculating unit 14 through calculation according to the transmission signal strength determined by the determining unit 11.

Optionally, the parameter information further includes a presenting capability, and the preset condition further includes a fourth preset condition, where the fourth preset condition is that an image is presented, or an image and a sound are presented.

The actual distance determined by the determining unit 11 meets the first preset condition, and the presenting capability meets the fourth preset condition; or the converted distance calculated by the calculating unit 14 meets the first preset condition, and the presenting capability meets the fourth preset condition; or the transmission signal strength determined by the determining unit 11 meets the second preset condition, and the presenting capability meets the fourth preset condition; or the position information of the candidate bridge device and the position information of the wearable device that are acquired by the acquiring unit 13 meet the third preset condition, and the presenting capability meets the fourth preset condition; or the actual distance meets the first preset condition, the transmission signal strength meets the second preset condition, and the presenting capability meets the fourth preset condition; or the converted distance meets the first preset condition, the transmission signal strength meets the second preset condition, and the presenting capability meets the fourth preset condition; or the actual distance meets the first preset condition, the position information of the candidate bridge device and the position information of the wearable device meet the third preset condition, and the presenting capability meets the fourth preset condition; or the converted distance meets the first preset condition, the position information of the candidate bridge device and the position information of the wearable device meet the third preset condition, and the presenting capability meets the fourth preset condition.

Optionally, the sending unit 12 is further configured to, before the determining unit 11 determines the identifier of the at least one bridge device, send a request message separately to the candidate bridge device, where the request message is used to request the candidate bridge device to separately provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: the actual distance between the candidate bridge device and the wearable device, and the position information of the candidate bridge device and the position information of the wearable device; or the information reporting service is the transmission signal strength reporting service, and the parameter information includes at least one of: the converted distance between the candidate bridge device and the wearable device, and the transmission signal strength between the candidate bridge device and the wearable device; or the information reporting service is the position information reporting service and the transmission signal strength reporting service, and the parameter information includes: the actual distance between the candidate bridge device and the wearable device, the position information of the candidate bridge device and the position information of the wearable device, and at least one of: the converted distance between the candidate bridge device and the wearable device, and the transmission signal strength between the candidate bridge device and the wearable device.

Optionally, the central device is the user equipment, the candidate bridge device, or the wearable device.

It should be noted that the user equipment may be an electronic device such as a smartphone, a computer, or a tablet computer, and the central device may be a device that can learn of a communication event.

According to the central device provided in this embodiment of the present invention, the central device learns of a communication event; the central device determines an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device; and finally, the central device sends, according to the identifier of the at least one bridge device, notification information corresponding to the communication event to the at least one bridge device, so that the at least one bridge device presents the notification information. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Figure 8:
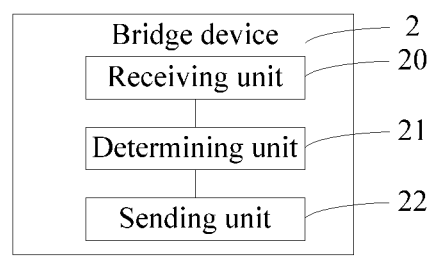
FIG. 8 is schematic structural diagram 1 of a bridge device according to an embodiment of the present invention.

As shown in FIG. 8, this embodiment of the present invention provides a bridge device 2, which is corresponding to a communication event notification method on a bridge device side. The bridge device 2 may include a receiving unit 20, a determining unit 21, and a sending unit 22.

The receiving unit 20 is configured to receive a transmission signal sent by a wearable device.

The determining unit 21 is configured to determine reference information of the bridge device according to the transmission signal received by the receiving unit 20, where the reference information of the bridge device includes: position information of the bridge device and position information of the wearable device; or includes transmission signal strength of the transmission signal; or includes position information of the bridge device, position information of the wearable device, and transmission signal strength.

The sending unit 22 is configured to report the reference information determined by the determining unit 21 to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition.

Figure 9:
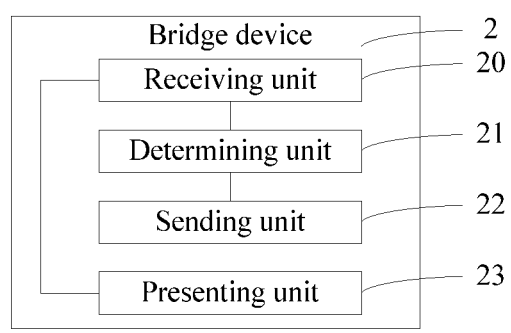
FIG. 9 is schematic structural diagram 2 of a bridge device according to an embodiment of the present invention.

Optionally, as shown in FIG. 9, the bridge device 2 further includes a presenting unit 23.

The receiving unit 20 is further configured to, after the sending unit 22 reports the reference information to the central device corresponding to the wearable device, receive the notification information sent by the central device.

The presenting unit 23 is configured to present, according to a presenting capability of the bridge device, the notification information received by the receiving unit 20.

Optionally, the reference information of the bridge device includes: the position information of the bridge device, the position information of the wearable device, and the presenting capability of the bridge device; or includes the transmission signal strength of the transmission signal and the presenting capability of the bridge device; or includes the position information of the bridge device, the position information of the wearable device, the transmission signal strength, and the presenting capability of the bridge device.

Optionally, the receiving unit 20 is further configured to, before receiving the transmission signal sent by the wearable device, receive a request message sent by the central device, where the request message is used to request the bridge device to provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: an actual distance between the candidate bridge device and the wearable device, and the position information of the candidate bridge device and the position information of the wearable device; or the information reporting service is the transmission signal strength reporting service, and the parameter information includes at least one of: a converted distance between the candidate bridge device and the wearable device, and transmission signal strength between the candidate bridge device and the wearable device; or the information reporting service is the position information reporting service and the transmission signal strength reporting service, and the parameter information includes: an actual distance between the candidate bridge device and the wearable device, the position information of the candidate bridge device and the position information of the wearable device, and at least one of: a converted distance between the candidate bridge device and the wearable device, and transmission signal strength between the candidate bridge device and the wearable device.

It should be noted that bridge devices may include a smart household appliance and an electronic device, for example, a mobile phone, a mobile power supply, a tablet computer, a personal digital assistant, a computer, a media player, a smart television, a sound box, a smart refrigerator, an air conditioner, a water heater, a microwave oven, and a treadmill. The bridge device in this embodiment of the present invention may be a smart device that can send and/or receive a transmission signal.

According to the bridge device provided in this embodiment of the present invention, the bridge device receives a transmission signal sent by a wearable device; the bridge device determines reference information of the bridge device according to the transmission signal, where the reference information of the bridge device includes: position information of the bridge device and position information of the wearable device, or includes transmission signal strength of the transmission signal, or includes position information of the bridge device, position information of the wearable device, and transmission signal strength; and the bridge device reports the reference information to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition. With this solution, the central device can present, by using the at least one bridge device, the notification information corresponding to the communication event, and the parameter information of the at least one bridge device meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Figure 10:
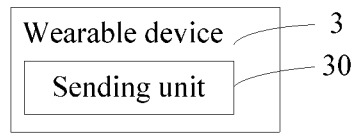
FIG. 10 is schematic structural diagram 1 of a wearable device according to an embodiment of the present invention.

As shown in FIG. 10, this embodiment of the present invention provides a wearable device 3, which is corresponding to a communication event notification method on a wearable device side. The wearable device 3 may include a sending unit 30.

The sending unit 30 is configured to send a first transmission signal to multiple candidate bridge devices, so that after acquiring multiple pieces of reference information separately according to the first transmission signal, the multiple candidate bridge devices send the multiple pieces of reference information to a central device; the central device determines multiple pieces of parameter information according to the multiple pieces of reference information, determines, from the multiple candidate bridge devices, an identifier of at least one bridge device of which parameter information meets a preset condition, and sends, according to the identifier of the at least one bridge device, notification information corresponding to a communication event to the at least one bridge device; and the at least one bridge device presents the notification information, where the notification information is information acquired according to the communication event after the communication event is learned, and the central device is corresponding to the wearable device.

Figure 11:
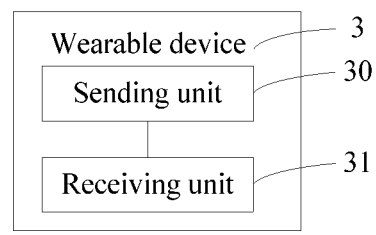
FIG. 11 is schematic structural diagram 2 of a wearable device according to an embodiment of the present invention.

Optionally, as shown in FIG. 11, the wearable device 3 further includes a receiving unit 31.

The receiving unit 31 is configured to, before the sending unit 30 sends the first transmission signal to the multiple candidate bridge devices, receive a second transmission signal separately sent by the multiple candidate bridge devices.

The sending unit 30 is further configured to send the first transmission signal to the multiple candidate bridge devices according to the second transmission signal received by the receiving unit 31, where an identifier of the wearable device is carried in the first transmission signal, and a message for requesting the wearable device to send the first transmission signal is carried in the second transmission signal.

Optionally, the first transmission signal sent by the sending unit 30 is a first Bluetooth broadcast signal.

The second transmission signal received by the receiving unit 31 is a second Bluetooth broadcast signal.

Optionally, the multiple candidate bridge devices are bridge devices having a signal strength reporting service; and the multiple candidate bridge devices and the central device belong to a same network.

It should be noted that the wearable device is a smart wearable device such as glasses, gloves, a watch, jewelry, apparel, or shoes. Current wearable devices include: a smartwatch, a smartband, a head-mounted display, smart shoes, an electronic drum machine T-shirt, and the like. The wearable device in this embodiment of the present invention may be a smart device that can be carried with a user and can send a transmission signal.

According to the wearable device provided in this embodiment of the present invention, the wearable device sends a first transmission signal to multiple candidate bridge devices, so that after acquiring multiple pieces of reference information separately according to the first transmission signal, the multiple candidate bridge devices send the multiple pieces of reference information to a central device; the central device determines multiple pieces of parameter information according to the multiple pieces of reference information, determines, from the multiple candidate bridge devices, an identifier of at least one bridge device of which parameter information meets a preset condition, and sends, according to the identifier of the at least one bridge device, notification information corresponding to a communication event to the at least one bridge device; and the at least one bridge device presents the notification information, where the notification information is information acquired according to the communication event after the communication event is learned, and the central device is corresponding to the wearable device. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Embodiment 4

Figure 12:
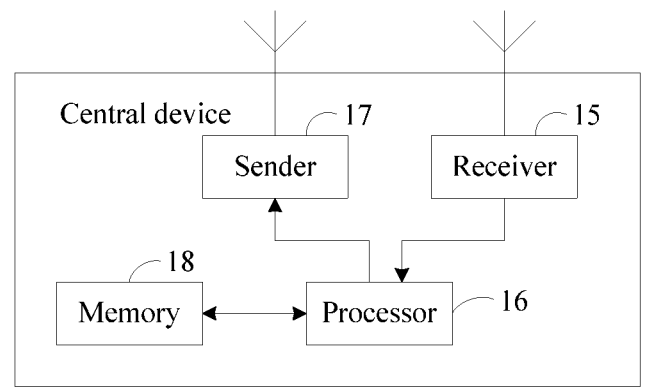
FIG. 12 is schematic structural diagram 3 of a central device according to an embodiment of the present invention.

As shown in FIG. 12, this embodiment of the present invention provides a central device, which is corresponding to a communication event notification method on a central device side. The central device may include: a receiver 15, a processor 16, a receiver 17, and a memory 18, where all of the receiver 15, the sender 17, and the memory 18 are connected to the processor 16, for example, all of the receiver 15, the sender 17, and the memory 18 may be connected to the processor 16 by using a bus.

The receiver 15 and the sender 17 may be integrated together to constitute a transceiver.

The processor 16 may be a central processing unit, or an application-specific integrated circuit, or one or more integrated circuits configured to implement this embodiment of the present invention.

The processor 16 is a control center of the central device; the processor 16 is connected to all parts of the entire central device by using various interfaces and lines, and implements various functions of a user equipment or processes data by running or executing a software program and/or a module that are/is stored in the memory 18 and invoking data stored in the memory 18. The processor 16 may be formed by an integrated circuit (Integrated Circuit, integrated circuit), for example, the processor 16 may be formed by a single packaged IC, or may be formed by connecting multiple packaged ICs having a same function or different functions.

Optionally, the processor 16 may include only a central processing unit, or may be a combination of a GPU (Graphic Processing Unit, graphics processing unit), a DSP (Digital Signal Processor, digital signal processor), and a control chip (for example, a baseband chip). In this embodiment of the present invention, the central processing unit may be a single-computing core, or may be a multi-computing core.

The memory 18 may be configured to store a software program and a module, and the processor 16 executes various functional applications of an electronic device and implements data processing by running the software program and the module that are stored in the memory 18. The memory 18 mainly includes a program storage area and a data storage area. The program storage area may store an operating system, an application program such as a sound playing program or an image playing program that is required by at least one function; and the data storage area may store data (such as audio data or a phonebook) that is created according to use of the electronic device, and the like. In a specific implementation manner of the present invention, the memory 18 may include a volatile memory, for example, a nonvolatile random access memory (Non-volatile Random Access Memory, NVRAM for short), a phase change random access memory (Phase Change RAM, PRAM for short), a magnetoresistive random access memory (Magetoresistive RAM, MRAM for short), or the like; and may further include a non-volatile memory (non-volatile memory), for example, at least one magnetic disk storage device, an electrically erasable programmable read-only memory (Electrically Erasable Programmable Read-Only Memory), and a flash memory such as a NOR flash memory (NOR flash memory) or a NAND flash memory (NAND flash memory). The non-volatile memory stores an operating system and an application program that are executed by the processor 16. The processor 16 loads, from the non-volatile memory, a running program and data to a memory, and stores digital content in a large number of storage apparatuses. The operating system includes various components and/or drivers that are configured to control and manage regular system tasks such as memory management, storage device control, and power management, and facilitate communication between various software and hardware. In this embodiment of the present invention, the operating system may be the Android system of Google, the iOS system developed by Apple, the Windows operating system developed by Microsoft, or the like; or may be an embedded operating system such as Vxworks.

The receiver 15 is configured to learn of a communication event; the processor 16 is configured to determine an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device; the sender 17 is configured to send, according to the identifier that is determined by the processor 16 and that is of the at least one bridge device, notification information corresponding to the communication event learned of by the receiver 15 to the at least one bridge device, so that the at least one bridge device presents the notification information; and the memory 18 is configured to store software code of the identifier of the at least one bridge device, software code of the notification information, and software code of the communication event, as well as a software program that controls the central device to complete the foregoing process; therefore, the processor 16 completes the foregoing process by executing the foregoing software program and invoking the foregoing software code.

Optionally, the parameter information is at least one of: the actual distance and the converted distance, and the preset condition includes a first preset condition, where the first preset condition is that the distance is shortest or the distance is less than a first preset threshold; or the parameter information is the transmission signal strength, and the preset condition includes a second preset condition, where the second preset condition is that the signal strength is strongest or the signal strength is greater than a second preset threshold; or the parameter information is the position information of the candidate bridge device and the position information of the wearable device, and the preset condition includes a third preset condition, where the third preset condition is that a preset geographical scope is met.

Optionally, the actual distance is determined, after the receiver 15 acquires the position information of the candidate bridge device and the position information of the wearable device that are reported by the candidate bridge device, by the processor 16 according to the position information of the candidate bridge device and the position information of the wearable device that are acquired by the receiver 15.

The transmission signal strength is determined by the processor 16 according to information that is reported by the candidate bridge device and acquired by the receiver 15.

The converted distance is obtained by the processor 15 through calculation according to the transmission signal strength.

Optionally, the parameter information further includes a presenting capability, and the preset condition further includes a fourth preset condition, where the fourth preset condition is that an image is presented, or an image and a sound are presented.

The actual distance determined by the processor 16 meets the first preset condition, and the presenting capability meets the fourth preset condition; or the converted distance calculated by the processor 16 meets the first preset condition, and the presenting capability meets the fourth preset condition; or the transmission signal strength determined by the processor 16 meets the second preset condition, and the presenting capability meets the fourth preset condition; or the position information of the candidate bridge device and the position information of the wearable device that are acquired by the processor 16 meet the third preset condition, and the presenting capability meets the fourth preset condition; or the actual distance meets the first preset condition, the transmission signal strength meets the second preset condition, and the presenting capability meets the fourth preset condition; or the converted distance meets the first preset condition, the transmission signal strength meets the second preset condition, and the presenting capability meets the fourth preset condition; or the actual distance meets the first preset condition, the position information of the candidate bridge device and the position information of the wearable device meet the third preset condition, and the presenting capability meets the fourth preset condition; or the converted distance meets the first preset condition, the position information of the candidate bridge device and the position information of the wearable device meet the third preset condition, and the presenting capability meets the fourth preset condition.

Optionally, the sender 17 is further configured to, before the processor 16 determines the identifier of the at least one bridge device, send a request message separately to the candidate bridge device, where the request message is used to request the candidate bridge device to separately provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: the actual distance between the candidate bridge device and the wearable device, and the position information of the candidate bridge device and the position information of the wearable device; or the information reporting service is the transmission signal strength reporting service, and the parameter information includes at least one of: the converted distance between the candidate bridge device and the wearable device, and the transmission signal strength between the candidate bridge device and the wearable device; or the information reporting service is the position information reporting service and the transmission signal strength reporting service, and the parameter information includes: the actual distance between the candidate bridge device and the wearable device, the position information of the candidate bridge device and the position information of the wearable device, and at least one of: the converted distance between the candidate bridge device and the wearable device, and the transmission signal strength between the candidate bridge device and the wearable device.

Optionally, the central device is the user equipment, the candidate bridge device, or the wearable device.

It should be noted that the user equipment may be an electronic device such as a smartphone, a computer, or a tablet computer, and the central device may be a device that can learn of a communication event.

According to the central device provided in this embodiment of the present invention, the central device learns of a communication event; the central device determines an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device; and finally, the central device sends, according to the identifier of the at least one bridge device, notification information corresponding to the communication event to the at least one bridge device, so that the at least one bridge device presents the notification information. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Figure 13:
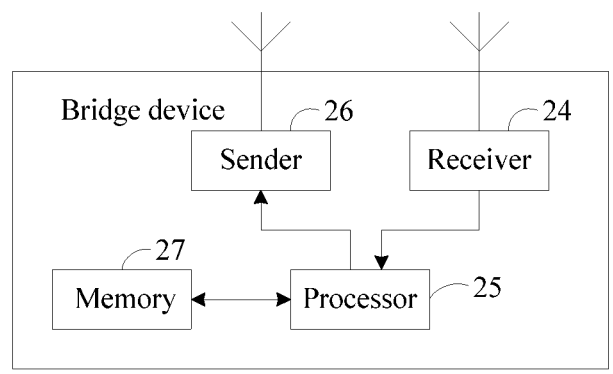
FIG. 13 is schematic structural diagram 3 of a bridge device according to an embodiment of the present invention.

As shown in FIG. 13, this embodiment of the present invention provides a bridge device, which is corresponding to a communication event notification method on a bridge device side. The bridge device may include: a receiver 24, a processor 25, a sender 26, and a memory 27, where all of the receiver 24, the sender 26, and the memory 27 are connected to the processor 25, for example, all of the sender 26, the receiver 24, and the memory 27 may be connected to the processor 25 by using a bus.

The receiver 24 and the sender 26 may be integrated together to constitute a transceiver.

The processor 25 may be a central processing unit, or an application-specific integrated circuit, or one or more integrated circuits configured to implement this embodiment of the present invention.

The memory 27 may be configured to store executable program code, where the program code includes computer operation instructions. The memory 27 may include a high-speed RAM memory, and may also include a non-volatile memory, for example, at least one disk memory.

The receiver 24 is configured to receive a transmission signal sent by a wearable device; the processor 25 is configured to determine reference information of the bridge device according to the transmission signal received by the receiver 24, where the reference information of the bridge device includes: position information of the bridge device and position information of the wearable device, or includes transmission signal strength of the transmission signal, or includes position information of the bridge device, position information of the wearable device, and transmission signal strength; the sender 26 is configured to report the reference information determined by the processor 25 to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition; and the memory 27 may be configured to store software code of the reference information, software code of the notification information, and a software program that controls the bridge device to complete the foregoing process; therefore, the processor 25 completes the foregoing process by executing the foregoing software program and invoking the foregoing software code.

Figure 14:
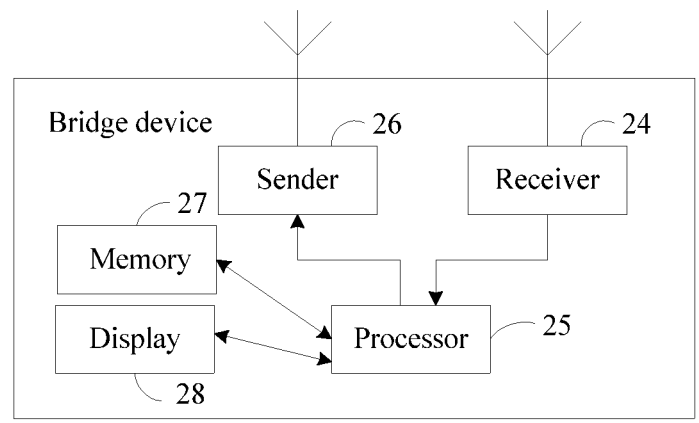
FIG. 14 is schematic structural diagram 4 of a bridge device according to an embodiment of the present invention.

Optionally, as shown in FIG. 14, the bridge device further includes a display 28. All of the receiver 24, the sender 26, the memory 27, and the display 28 are connected to the processor 25, for example, all of the receiver 24, the sender 26, the memory 27, and the display 28 may be connected to the processor 25 by using a bus.

The receiver 24 is further configured to, after the sender 26 reports the reference information to the central device corresponding to the wearable device, receive the notification information sent by the central device.

The display 28 is configured to present, according to a presenting capability of the bridge device, the notification information received by the receiver 24.

It should be noted that the display 28 can display a video and audio. The display 28 may include a display panel, for example, a display panel disposed in a form of an LCD (Liquid Crystal Display, liquid crystal display), an OLED (Organic Light-Emitting Diode, organic light-emitting diode), and an FED (field emission display, field emission display). Alternatively, the display 28 may be a reflective display, for example, an electrophoretic (electrophoretic) display, or a display that employs a technology of interferometric modulation of light (Interferometric Modulation of Light). The display 28 may be a single display or multiple displays of different sizes.

In a specific implementation manner of the present invention, the display 28 may include a filter and an amplifier that are configured to filter and amplify a video output by the processor 25. The display 28 may further include a digital-to-analog converter that is configured to convert an audio signal output by the processor 25 from a digital format to an analog format.

Optionally, the reference information of the bridge device includes: the position information of the bridge device, the position information of the wearable device, and the presenting capability of the bridge device; or includes the transmission signal strength of the transmission signal and the presenting capability of the bridge device; or includes the position information of the bridge device, the position information of the wearable device, the transmission signal strength, and the presenting capability of the bridge device.

Optionally, the receiver 24 is further configured to, before receiving the transmission signal sent by the wearable device, receive a request message sent by the central device, where the request message is used to request the bridge device to provide an information reporting service, and the information reporting service is: a position information reporting service, a transmission signal strength reporting service, or a position information reporting service and a transmission signal strength reporting service, where the information reporting service is the position information reporting service, and the parameter information includes at least one of: an actual distance between the candidate bridge device and the wearable device, and the position information of the candidate bridge device and the position information of the wearable device; or the information reporting service is the transmission signal strength reporting service, and the parameter information includes at least one of: a converted distance between the candidate bridge device and the wearable device, and transmission signal strength between the candidate bridge device and the wearable device; or the information reporting service is the position information reporting service and the transmission signal strength reporting service, and the parameter information includes: an actual distance between the candidate bridge device and the wearable device, the position information of the candidate bridge device and the position information of the wearable device, and at least one of: a converted distance between the candidate bridge device and the wearable device, and transmission signal strength between the candidate bridge device and the wearable device.

It should be noted that bridge devices may include a smart household appliance and an electronic device, for example, a mobile phone, a mobile power supply, a tablet computer, a personal digital assistant, a computer, a media player, a smart television, a sound box, a smart refrigerator, an air conditioner, a water heater, a microwave oven, and a treadmill. The bridge device in this embodiment of the present invention may be a smart device that can send and/or receive a transmission signal.

According to the bridge device provided in this embodiment of the present invention, the bridge device receives a transmission signal sent by a wearable device; the bridge device determines reference information of the bridge device according to the transmission signal, where the reference information of the bridge device includes: position information of the bridge device and position information of the wearable device, or includes transmission signal strength of the transmission signal, or includes position information of the bridge device, position information of the wearable device, and transmission signal strength; and the bridge device reports the reference information to a central device, so that the central device determines corresponding parameter information according to reference information reported by all candidate bridge devices, determines an identifier of at least one bridge device according to the parameter information, and sends, according to the identifier of the at least one bridge device, notification information corresponding to a communication event to the at least one bridge device, where parameter information of the at least one bridge device meets a preset condition. With this solution, the central device can present, by using the at least one bridge device, the notification information corresponding to the communication event, and the parameter information of the at least one bridge device meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Figure 15:
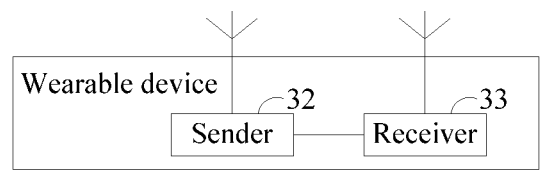
FIG. 15 is schematic structural diagram 3 of a wearable device according to an embodiment of the present invention.

As shown in FIG. 15, this embodiment of the present invention provides a wearable device, which is corresponding to a communication event notification method on a wearable device side. The wearable device may include a sender 32 and a receiver 33.

The receiver 32 and the sender 33 may be integrated together to constitute a transceiver.

The sender 32 is configured to send a first transmission signal to multiple candidate bridge devices, so that after acquiring multiple pieces of reference information separately according to the first transmission signal, the multiple candidate bridge devices send the multiple pieces of reference information to a central device; the central device determines multiple pieces of parameter information according to the multiple pieces of reference information, determines, from the multiple candidate bridge devices, an identifier of at least one bridge device of which parameter information meets a preset condition, and sends, according to the identifier of the at least one bridge device, notification information corresponding to a communication event to the at least one bridge device; and the at least one bridge device presents the notification information, where the notification information is information acquired according to the communication event after the communication event is learned, and the central device is corresponding to the wearable device.

The receiver 32 is configured to, before the sender 33 sends the first transmission signal to the multiple candidate bridge devices, receive a second transmission signal separately sent by the multiple candidate bridge devices.

The sender 33 is further configured to send the first transmission signal to the multiple candidate bridge devices according to the second transmission signal received by the receiver 32, where an identifier of the wearable device is carried in the first transmission signal, and a message for requesting the wearable device to send the first transmission signal is carried in the second transmission signal.

Optionally, the first transmission signal sent by the sender 33 is a first Bluetooth broadcast signal.

The second transmission signal received by the receiver 32 is a second Bluetooth broadcast signal.

Optionally, the multiple candidate bridge devices are bridge devices having a signal strength reporting service; and the multiple candidate bridge devices and the central device belong to a same network.

It should be noted that the wearable device is a smart wearable device such as glasses, gloves, a watch, jewelry, apparel, or shoes. Current wearable devices include: a smartwatch, a smartband, a head-mounted display, smart shoes, an electronic drum machine T-shirt, and the like. The wearable device in this embodiment of the present invention may be a smart device that can be carried with a user and can send a transmission signal.

According to the wearable device provided in this embodiment of the present invention, the wearable device sends a first transmission signal to multiple candidate bridge devices, so that after acquiring multiple pieces of reference information separately according to the first transmission signal, the multiple candidate bridge devices send the multiple pieces of reference information to a central device; the central device determines multiple pieces of parameter information according to the multiple pieces of reference information, determines, from the multiple candidate bridge devices, an identifier of at least one bridge device of which parameter information meets a preset condition, and sends, according to the identifier of the at least one bridge device, notification information corresponding to a communication event to the at least one bridge device; and the at least one bridge device presents the notification information, where the notification information is information acquired according to the communication event after the communication event is learned, and the central device is corresponding to the wearable device. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

Embodiment 5

Figure 16:
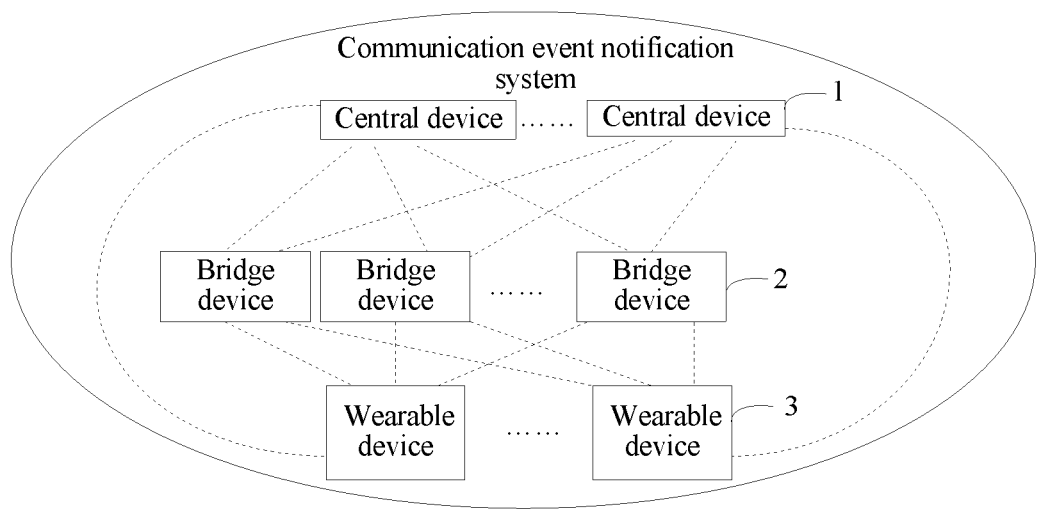
FIG. 16 is a block diagram of a communication event notification system according to an embodiment of the present invention.

As shown in FIG. 16, this embodiment of the present invention provides a communication event notification system, including:

at least one central device 1 described in Embodiment 1 or Embodiment 2, and at least one bridge device 2 and at least one wearable device 3 that communicate with the central device in Embodiment 1 or Embodiment 2.

The communication event notification system provided in this embodiment of the present invention is corresponding to a communication event notification method on a central device side, a communication event notification method on a bridge device side, or a communication event notification method on a wearable device side. The communication event notification method on the central device side is illustrated as an example in the following.

Optionally, in a smart home system, a central device learns of a communication event; the central device determines an identifier of at least one bridge device according to parameter information of a candidate bridge device, where parameter information of the at least one bridge device meets a preset condition, and the parameter information of the candidate bridge device includes at least one of the following: an actual distance between the candidate bridge device and a wearable device, a converted distance between the candidate bridge device and the wearable device, transmission signal strength between the candidate bridge device and the wearable device, and position information of the candidate bridge device and position information of the wearable device; and finally, the central device sends, according to the identifier of the at least one bridge device, notification information corresponding to the communication event to the at least one bridge device, so that the at least one bridge device presents the notification information. With this solution, the central device can present, by using the at least one bridge device, the notification information corresponding to the communication event, and the at least one bridge device is a bridge device of which parameter information meets the preset condition, that is, the central device can select at least one bridge device whose distance from the wearable device or whose reported transmission signal strength meets a specific condition, so as to ensure presentation of the notification information; therefore, the notification information can be flexibly presented according to the preset condition.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the module or unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A system, comprising:
   a central device;
   a first candidate bridge device;
   a second candidate bridge device; and
   a wearable device carried by a user;
   wherein the central device is configured to communicate with the first candidate bridge device and the second candidate bridge device;
   wherein the wearable device is configured to communicate with the first candidate bridge device and the second candidate bridge device, and transmit a transmission signal to the first candidate bridge device and the second candidate bridge device;
   wherein the first candidate bridge device is configured to transmit information related to a first transmission signal strength to the central device, wherein the first transmission signal strength is a signal strength of the transmission signal received at the first candidate bridge device;
   wherein the second candidate bridge device is configured to transmit information related to a second transmission signal strength to the central device, wherein the second transmission signal strength is a signal strength of the transmission signal received at the second candidate bridge device; and
   wherein the central device is configured to select at least one target device from a first plurality of candidate bridge devices including the first candidate bridge device and the second candidate bridge device based on the information related to the first transmission signal strength and the information related to the second transmission signal strength; and
   wherein the central device is further configured to transmit, to the at least one target device, a notification corresponding to a communication event prompted on the central device, the notification enabling the at least one target device to present the notification to the user.

2. The system according to claim 1, wherein each candidate bridge device of the first plurality of candidate bridge devices is configured to receive the transmission signal transmitted by the wearable device, and wherein a signal strength of the transmission signal received at the at least one target device is greater than a signal strength threshold.

3. The system according to claim 1, wherein each candidate bridge device of the first plurality of candidate bridge devices is configured to receive the transmission signal transmitted by the wearable device, and a signal strength of the transmission signal received at the at least one target device is the strongest of signal strengths of the first plurality of candidate bridge devices.

4. The system according to claim 1, wherein the central device is further configured to receive capability information from each candidate bridge device of a second plurality of candidate bridge devices, wherein the capability information indicates whether the respective candidate bridge device is capable of presenting, to the user, at least one of an image and a sound; and
wherein the central device is further configured to determine the first plurality of candidate bridge devices from the second plurality of candidate bridge devices based on the capability information of each candidate bridge device of the second plurality of candidate bridge devices.

5. The system according to claim 1, wherein the first candidate bridge device is further configured to transmit a first capability information to the central device, wherein the first capability information indicates whether the first candidate bridge device is capable of presenting at least one of an image and a sound;
wherein the second candidate bridge device is further configured to transmit a second capability information to the central device, wherein the second capability information indicates whether the second candidate bridge device is capable of presenting at least one of an image and a sound; and
wherein the central device is further configured to determine the at least one target device based on the first capability information and the second capability information.

6. A method for notification of a communication event at a central device, comprising:
receiving information related to a first transmission signal strength from a first candidate bridge device, wherein the first transmission signal strength is a signal strength of a transmission signal received at the first candidate bridge device, wherein the transmission signal is sent from a wearable device carried by a user;
receiving information related to a second transmission signal strength from a second candidate bridge device, wherein the second transmission signal strength is a signal strength of the transmission signal received at the second candidate bridge device;
selecting at least one target device from a first plurality of candidate bridge devices including the first candidate bridge device and the second candidate bridge device based on the information related to the first transmission signal strength and the information related to the second transmission signal strength; and
transmitting, to the at least one target device, a notification corresponding to a communication event prompted on the central device, the notification enabling the at least one target device to present the notification to the user.

7. The method according to claim 6, wherein each candidate bridge device of the first plurality of candidate bridge devices is configured to receive the transmission signal transmitted by the wearable device, and a signal strength of the transmission signal received at the at least one target device is greater than a signal strength threshold.

8. The method according to claim 6, wherein each of the first plurality of candidate bridge devices is configured to receive the transmission signal transmitted by the wearable device, and a signal strength of the transmission signal received at the at least one target device is the strongest of signal strengths of the first plurality of candidate bridge devices.

9. The method according to claim 6, the method further comprising:
receiving capability information from each candidate bridge device of a second plurality of candidate bridge devices, wherein the capability information indicates whether the respective candidate bridge device is capable of presenting, to the user, at least one of an image and a sound; and
determining the first plurality of candidate bridge devices from the second plurality of candidate bridge devices based on capability information of each of the second plurality of candidate bridge devices.

10. The method according to claim 6, wherein the method further comprising:
receiving first capability information from the first candidate bridge device, wherein the first capability information indicates whether the first candidate bridge device is capable of presenting, to the user, at least one of an image and a sound;
receiving a second capability information from the second candidate bridge device, wherein the second capability information indicate whether the second candidate bridge device is capable of presenting, to the user, at least one of an image and a sound;
determining the at least one target device based on the first capability information and the second capability information.

11. A central device, comprising:
one or more processors; and
a non-transitory memory connected to the one or more processors and storing one or more programs configured to be executed by the one or more processors, wherein the one or more programs include instructions for:
receiving information related to a first transmission signal strength from a first candidate bridge device, wherein the first transmission signal strength is a signal strength of a transmission signal received at the first candidate bridge device, wherein the transmission signal is sent from a wearable device carried by a user;
receiving information related to a second transmission signal strength from a second candidate bridge device, wherein the second transmission signal strength is a signal strength of the transmission signal received at the second candidate bridge device;
selecting at least one target device from a first plurality of candidate bridge devices including the first candidate bridge device and the second candidate bridge device based on the information related to the first transmission signal strength and the information related to the second transmission signal strength; and transmitting, to the at least one target device, a notification corresponding to a communication event prompted on the central device, the notification enabling the at least one target device to present the notification to the user.

12. The central device according to claim 11, wherein each of the first plurality of candidate bridge devices is configured to receive the transmission signal transmitted by the wearable device, and wherein a signal strength of the transmission signal received at the at least one target device is greater than a signal strength threshold.

13. The central device according to claim 11, wherein each of the first plurality of candidate bridge devices is configured to receive the transmission signal transmitted by the wearable device, and wherein a signal strength of the transmission signal received at the at least one target device is the strongest of signal strengths of the first plurality of candidate bridge devices.

14. The central device according to claim 11, wherein the one or more programs further include instructions for:
receiving capability information from each candidate bridge device of a second plurality of candidate bridge devices, wherein the capability information indicates whether the respective candidate bridge device is capable of presenting, to the user, at least one of an image and a sound; and
determining the first plurality of candidate bridge devices from the second plurality of candidate bridge devices based on capability information of each candidate bridge device of the second plurality of candidate bridge devices.

15. The central device according to claim 11, wherein the one or more programs further include instructions for:
receiving a first capability information from the first candidate bridge device, wherein the first capability information indicates whether the first candidate bridge device is capable of presenting, to the user, at least one of an image and a sound;
receiving a second capability information from the second candidate bridge device, wherein the second capability information indicate whether the second candidate bridge device is capable of presenting, to the user, at least one of an image and a sound; and
determining the at least one target device based on the first capability information and the second capability information.

* * * * *